(12) United States Patent
Kim et al.

(10) Patent No.: US 12,279,717 B2
(45) Date of Patent: Apr. 22, 2025

(54) BLENDER

(71) Applicant: LG ELECTRONICS INC., Seoul (KR)

(72) Inventors: Min Gyu Kim, Seoul (KR); Dae Yong Kang, Seoul (KR); Woonkyu Seo, Seoul (KR); Jin Hae Ye, Seoul (KR); Sang Jin Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 699 days.

(21) Appl. No.: 17/613,844

(22) PCT Filed: Aug. 6, 2020

(86) PCT No.: PCT/KR2020/010367
§ 371 (c)(1),
(2) Date: Nov. 23, 2021

(87) PCT Pub. No.: WO2021/029602
PCT Pub. Date: Feb. 18, 2021

(65) Prior Publication Data
US 2022/0225834 A1    Jul. 21, 2022

(30) Foreign Application Priority Data
Aug. 13, 2019 (KR) .................. 10-2019-0098868

(51) Int. Cl.
*A47J 43/00* (2006.01)
*A47J 43/046* (2006.01)
(Continued)

(52) U.S. Cl.
CPC ......... *A47J 43/046* (2013.01); *A47J 43/0722* (2013.01); *A47J 43/0777* (2013.01); *H01B 5/14* (2013.01)

(58) Field of Classification Search
CPC ........ A47J 43/0722; A47J 43/046; H01B 5/14
See application file for complete search history.

(56) References Cited

U.S. PATENT DOCUMENTS

| 2015/0117141 A1 | 4/2015 | Brotzki et al. |
| 2016/0309960 A1 | 10/2016 | Kolar et al. |
| 2018/0020875 A1* | 1/2018 | Kolar .................. A47J 43/0777 366/279 |

FOREIGN PATENT DOCUMENTS

| JP | 2001299583 A | 10/2001 |
| JP | 201829096 A | 2/2018 |
| KR | 10-0796634 B1 | 1/2008 |

OTHER PUBLICATIONS

Office Action for KR Application No. 10-2020-0100532 dated Sep. 2, 2024.

* cited by examiner

*Primary Examiner* — Anshu Bhatia
(74) *Attorney, Agent, or Firm* — Bryan Cave Leighton Paisner LLP

(57) ABSTRACT

A blender which an electrical signal via a transparent film so as to detect whether a container lid is closed. The blender includes a container body receiving food; a main body provided under the container body and supporting the container body; a container lid mounted removably to the upper surface of the container body and configured to open/close the upper part of the container body; and a detection system configured to detect whether the container lid is mounted to the container body, wherein the detection system includes a transparent electrode film attached to the surface of the container body and guiding the flow of electricity. Accordingly, the transparent electrode film can transmit whether the (Continued)

container lid is mounted to the main body without spoiling the appearance of the container body made of a transparent material.

13 Claims, 20 Drawing Sheets

(51) Int. Cl.
*A47J 43/07* (2006.01)
*H01B 5/14* (2006.01)

BLENDER

CROSS-REFERENCE TO RELATED APPLICATIONS

This application is a National Stage filing under 35 U.S.C. 371 of International Application No. PCT/KR2020/010367, with an international filing date of Aug. 6, 2020, which claims the benefit of KR Patent Application No. 10-2019-0098868, filed on Aug. 13, 2019, all of which are incorporated by reference in their entirety herein.

TECHNICAL FIELD

The present disclosure relates generally to a blender. More particularly, the present disclosure relates to a blender which has the function of detecting whether a container lid is closed by transmitting an electrical signal via a transparent film.

BACKGROUND

Generally, a blender is referred to as a mixer or crusher, and is mainly used for crushing or chopping food contained in a container body by rotating blades rotated by the motor.

In a normal blender, a main body having a motor operated by electricity is located at the lower side of the blender, and the container body receiving food is seated on the upper side of such a main body. Blades crushing or chopping the food are provided inside the container body, and are rotated by the rotational force of the motor.

Accordingly, when a user drives the motor by using a manipulation button or a knob of the main body after putting the food in the container body, the blades receiving the rotational force generated by the motor crush or chop the food contained inside the container body.

Such a blender has recently been developed in accordance with a user's desire to facilitate the intake of food, such as, office workers in their busy daily life. That is, a small hand blender has been developed, and a blender has been developed that allows the food to be crushed in a larger capacity or at high speed.

In addition, to process food ingredients contained in a container body of a blender in a fresher state, a vacuum blender, which cuts or crushes the food by vacuuming the inside of the container body has been disclosed.

However, what is increasingly emphasized in these various types of blenders is a safe use along with the taste and nutrition of the food processed by the blenders. That is, when a blade rotates in a state in which the container lid is opened, the food received in the container body is spilled to the outside and splattered, and when a child puts their hand inside the container body, an accident may occur.

Accordingly, a technology for detecting whether the container lid is mounted has been developed and disclosed.

For example, in U.S. Pat. Nos. 6,910,800 and 7,871,196, a push rod mechanically connecting the container body with the main body is installed, and when the container lid closes the container body, the container lid presses the push rod.

Specifically, in U.S. Pat. No. 6,910,800, a link is configured to be vertically long along a side surface of the container body, and when the container lid located at the upper side is closed, a protrusion of the container lid presses the upper end of the link downward to move the lower end of the link downward such that the container lid of the container body can be mechanically detected.

In addition, U.S. Pat. No. 7,871,196, a link configured to transmit whether the container lid of the container body is closed is not provided vertically on a side surface of the container body, but is provided inside a handle of the container body. That is, a push rod installed to be vertically long is installed in a groove of an inside of a handle, and when the push rod is moved downward due to the closure of the container lid from the upper side, a lower switch provided at the lower side is activated by the push rod to detect the closure of the container lid.

However, in such a prior art, a separate push rod or push block is required to be installed, and a link or push rod configured to be vertically long is required to be installed according to the length of the container body, and thus manufacturing and assembling thereof are difficult. Furthermore, the link or push rod may lose its detection function due to wear or damage thereto caused by frequent use, and may cause a detection failure (a signal transmission failure) due to the twisting or bending of the link or push rod which is considerably long.

Furthermore, the push rod and a push detection part are required to be installed separately from each other, and the push detection part may be contaminated by moisture or food introduced thereinto. The push rod of the container body and the push detection part of the main body are required to be installed at positions corresponding to each other, so there is a problem in that the container body is required to be mounted only in a specific direction.

In addition, in a connection structure in which a mechanical structure (or a wire) like the prior art is used to transmit a signal to the upper and lower side of the container body, when the container body is formed to be transparent or translucent, at least a portion of the container body is required to be opaque such that a transmission equipment or wire is invisible from the outside, so the degree of freedom in design is reduced.

Additionally, in a method in which a mechanical structure (or a wire) is used, water scale or external contaminants build up in the gap of a part in which the structure is attached to or detached from, thereby causing contamination and water introduction therein.

In addition, in the conventional method in which a structure for a signal transmission is provided in the handle, the structure of the handle is complex, and since the structure is required to be installed in the narrow inner space of the handle, the assembly of the handle is difficult and repair thereof is also difficult during malfunction thereof. Furthermore, the structure for a signal transmission is required to be installed vertically through the handle, and the upper and lower ends of the handle are constantly required to be attached to the container body, so the degree of freedom in the design of the handle (the configuration of removing the lower end of the handle from the container body, etc.) decreases.

Accordingly, to solve such a problem, in European Patent No. EP2548485, there is a blender in which when a container lid closes a container body, a main body recognizes the closure of the container lid of the container body by using a wireless communication module.

However, in such a prior art, the wireless communication module is required between the container body and the main body, and a separate power supply (a battery or dry cell, etc.) is required to be provided in the container body so as to drive the wireless communication module.

In addition, there is a problem in that communication confusion occurs due to a plurality of communication and a communication error occurs. That is, wireless power transmission or wireless communication between the main body and an external electrical supply device (a cooktop, etc.) is required, and further, it is also required to transmit whether the closure of the container lid is detected by wireless communication between the container body and the main body, so communication confusion may occur.

Due to these prior problems, in US Patent Application Publication No. 2018-0020875, there has been recently disclosed an interlocking blending device in which a pair of transmission and reception coils are disposed in a main body, and a pair of reception and transmission coils corresponding to the coils are disposed in a container body, and when a container lid closes the container body, power is transmitted to the reception coil of the container body by the transmission coil of the main body, and in turn, is transmitted to the reception coil of the main body by the transmission coil of the container body such that the main body recognizes the closure of the container lid of the container body.

That is, in US Patent Application Publication No. 2018-0020875, there is disclosed a structure in which a push rod is installed vertically along the side surface of the container body, and a detection signal of the container lid is mechanically transmitted to the lower side of the container body, and according to whether a switch of the upper side of the container body is turned on or off by the container lid, a circuit connected to the lower part of the container body is closed or opened such that the signal is or is not transmitted to a base.

However, even in such a prior art, each of the main body and the container body is required to have two coils, that is, the transmission coil and the reception coil, and a device which analyzes the power received by the reception coil of the main body is required.

Furthermore, the two coils are disposed in each of the main body and the container body, and when current flows through each of the coils, change in the induced current occurs due to interference between magnetic fields induced in the coils, so it is difficult to accurately analyze the power received by the reception coil of the main body.

In addition, the transmission coil of the main body transmits the power to the reception coil of the container body, and due to the closure of the container lid, the transmission coil of the container body transmits the power to the reception coil of the main body. Thus, there is a problem in that the transmission coil of the main body is required to transmit high power to the reception coil of the container body such that the reception coil of the main body receives a significant power.

Additionally, for connection between two switches located on the upper end portion of the container body and electrical signal transmission between the upper end lower ends of the container body, a connection wire is installed at the circumference of the upper end of the container body, and a connection is installed to connect the upper and lower ends of the container body to each other.

Accordingly, such connection wires are installed on the circumference of the upper end of the container body and vertically on the side surface of the container body, respectively, and thus spoil the appearance of the container body made of a transparent material. That is, the connection wire for electrical signal transmission is installed on the surface of the container body, and thus may be cut by interference, or the appearance of the container body is spoiled due to installation of the connection wire which is colored on the transparent container body.

Meanwhile, in such a prior art, the container lid is configured as a single part, so there is a problem in that when introducing the food into the container body, the entirety of the container lid is required to be opened. Furthermore, the handle is made of a single material or of the same material as the material of the container body, so there is a problem in that the handle gives a crude or rough look to a user.

In addition, the container body and the main body are in contact with each other with portions of the container body and the main body separated from each other, so when foreign matter is introduced in a gap between the container body and the main body, the power or signal transmission is not performed properly.

SUMMARY

Accordingly, the present disclosure has been made to solve the above problems occurring in the prior art, and is intended to propose a blender in which a detection signal of the closure of the container lid of a container body is electrically transmitted to a main body.

The present disclosure is intended to propose a blender in which detection error or contamination due to external contaminants such as water or food is prevented.

The present disclosure is intended to propose a blender in which an electrical or signal transmission part provided in the container body is blocked to the outside.

The present disclosure is intended to propose a blender in which the installation and follow-up service of an electrical or signal transmission part provided in the container body is facilitated.

Technical Solution

In order to accomplish the above objectives, according to one aspect of a blender of the present disclosure, the blender of the present disclosure may include a detection system configured to detect whether a container lid is mounted via an electrical signal.

In the blender of the present disclosure, a coil holder may be provided between a bottom surface of an outer container body and a lower surface of the inner container body. Accordingly, foreign matter may be prevented from being introduced to the coil holder from the outside.

In the blender of the present disclosure, a coil may be formed, or the coil holder which enables the transmission or reception of a signal may have a shape of a circular ring. Accordingly, even when power of a motor assembly of the main body is transmitted to a blade assembly located inside the container body, the interference of the coil holder therewith may be prevented.

In the blender of the present disclosure, a power reception part configured to receive power supplied from the main body and a signal transmission part configured to emit light by electricity may be provided in the coil holder.

In the blender of the present disclosure, the coil holder provided with the power reception part and the signal transmission part may be covered by an upper cover and a lower cover.

In the blender of the present disclosure, the upper cover and the lower cover covering the coil holder may be fastened to each other by a hook.

In the blender of the present disclosure, the power reception part and the signal transmission part may be installed on the left and right ends, respectively, of the coil holder or on the right and left ends thereof, respectively, such that the power reception part and the signal transmission part are spaced apart from each other.

In addition, the power reception part and the signal transmission part may be installed on an end of the coil holder such that the power reception part and the signal transmission part are close to each other.

Furthermore, the power reception part may include an induction coil which receives power by induced electromotive force.

The signal transmission part may include an LED which generates light.

The power reception part and the signal transmission part may be electrically connected to each other by a printed circuit board.

Additionally, in the blender of the present disclosure, the detection system configured to detect whether the container lid is mounted to the container body may be provided, wherein the detection system may include a transparent electrode film which guides the flow of electricity, and the coil holder may have a holder terminal provided on an end thereof, the lower end of the transparent electrode film being fitted into and connected to the holder terminal.

An upper edge may be formed on the outer circumferential surface of the upper cover by vertically bending downward and extending, and an upper hole edge may be formed in a center hole of the upper cover by extending downward, the upper hole edge corresponding to the upper edge.

The outer edge of the lower cover may bend vertically upward to constitute a lower edge, and the inner hole edge of the lower cover may protrude upward to constitute a lower hole edge.

The upper edge and upper hole edge of the upper cover may be formed to be stepped such that an edge step part and a hole step part are formed, and the lower edge and lower hole edge of the lower cover may be seated on the edge step part and the hole step part, respectively.

A terminal holder may be formed on an end of the upper cover by protruding upward therefrom, the holder terminal of the coil holder being received in the terminal holder.

The upper cover or the lower cover may include a holding guide piece formed by protruding downward or upward, respectively, therefrom, and the coil holder may include a holding groove through which the holding guide piece passes.

A hook passing groove in which a hook formed on the upper cover or the lower cover passes through or received may be formed in the coil holder.

According to such a configuration, the coil holder may be securely held by the covers.

Advantageous Effects

The blender of the present disclosure has the following effects.

First, in the blender of the present disclosure, an electrical circuit formed in the container body may be configured to be opened or closed according to whether the container lid is closed such that the closure of the container lid is electrically detected. Accordingly, the blender of the present disclosure may perform precise detection even during long-term use compared to a mechanical detection of the prior art.

Second, in the blender of the present disclosure, a coil may be formed, or the coil holder which enables the transmission or reception of a signal may be provided between the bottom surface of the outer container body and the lower surface of the inner container body. Accordingly, foreign matter may be prevented from being introduced to the coil holder from the inside or outside of the container body such that electrical signal transmission and power transmission are not prevented.

Third, in the blender of the present disclosure, a coil may be formed, or the coil holder which enables the transmission or reception of a signal may have a shape of a circular ring. Accordingly, power of the motor assembly of the main body may be transmitted to the blade assembly located inside the container body through a center hole of the coil holder, thereby preventing the interference of a rotating shaft of the motor assembly with the coil holder.

Fourth, in the blender of the present disclosure, the power reception part configured to receive power supplied from the main body and the signal transmission part configured to emit light by electricity may be provided in the coil holder. Accordingly, due to the mounting of the coil holder, the power reception part and the signal transmission part may be installed at precise positions, respectively, thereby improving workability.

Fifth, in the blender of the present disclosure, the coil holder may be covered by an upper cover and a lower cover, and edges corresponding to each other may be formed on the upper cover and the lower cover, respectively, the edges being formed at upper and lower sides, respectively, to overlap each other. Accordingly, the power reception part and the signal transmission part may be protected by being completely blocked from the outside, thereby preventing malfunction thereof due to the stable performances of the transmission and reception of a signal.

Sixth, in the blender of the present disclosure, the power reception part and the signal transmission part may be installed on the left and right ends, respectively, of the coil holder or on the right and left ends thereof, respectively, such that the power reception part and the signal transmission part are spaced apart from each other. Alternatively, the power reception part and the signal transmission part may be installed on one side of the coil holder. The power reception part and the signal transmission part may be electrically connected to each other by a printed circuit board. Accordingly, the use of narrow space in which the container body and the main body are coupled to each other may be easy, thereby enabling the configuration of a compact product.

Seventh, in the blender of the present disclosure, the holder terminal may be provided on an end of the coil holder, a lower end of a transparent electrode film being fitted into and connected to a holder terminal. Accordingly, due to the fitting of the lower end of the transparent electrode film to the holder terminal, the transparent electrode film, and the power reception part and the signal transmission part provided in the coil holder may be electrically connected to each other, thereby facilitating assembling and disassembling thereof.

Eighth, in the blender of the present disclosure, the upper cover or the lower cover may include a holding guide piece formed by protruding downward or upward, respectively, therefrom, and the coil holder may include a holding groove through which the holding guide piece passes. Accordingly, the coil holder mounted inside the upper and lower covers may be accurately held at a precise position and assembly thereof may be easy.

Ninth, in the blender of the present disclosure, the upper cover and the lower cover covering the coil holder may be coupled to each other by hooks. Accordingly, the assembling and disassembling of the coil holder may be easy, and thus the efficiency of a follow-up service thereof may be improved.

DETAILED DESCRIPTION

Hereinafter, a blender of the present disclosure will be described in detail with reference to the accompanying drawings.

Figure 1:
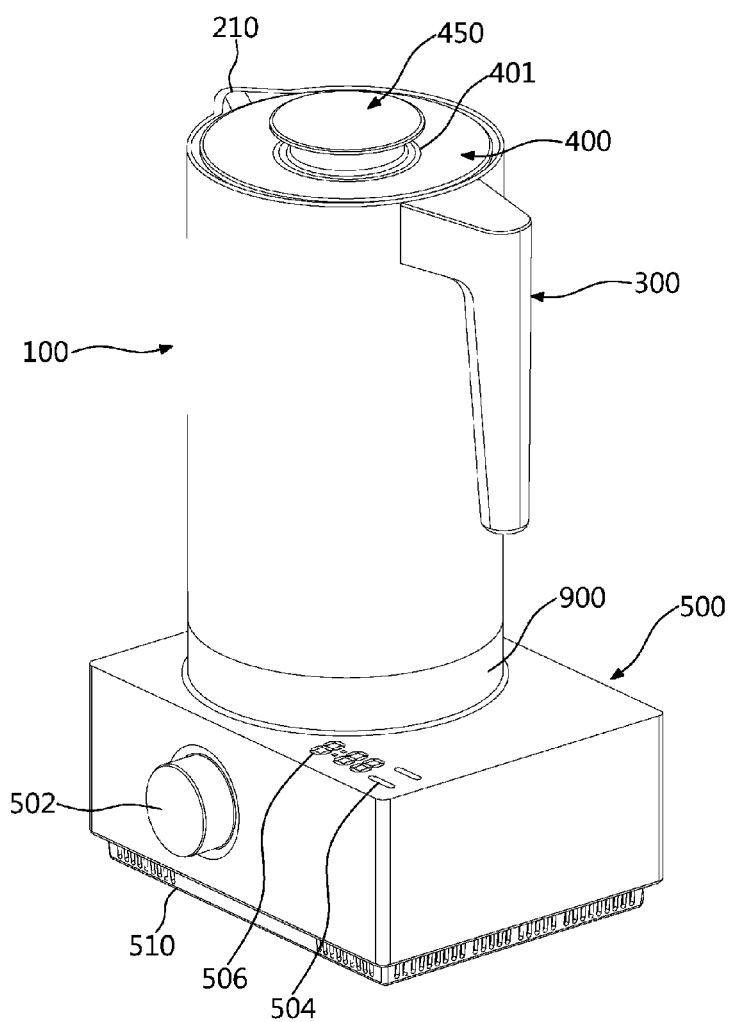
FIG. 1 is a perspective view illustrating a configuration of a blender according to an exemplary embodiment of the present disclosure.
Figure 2:
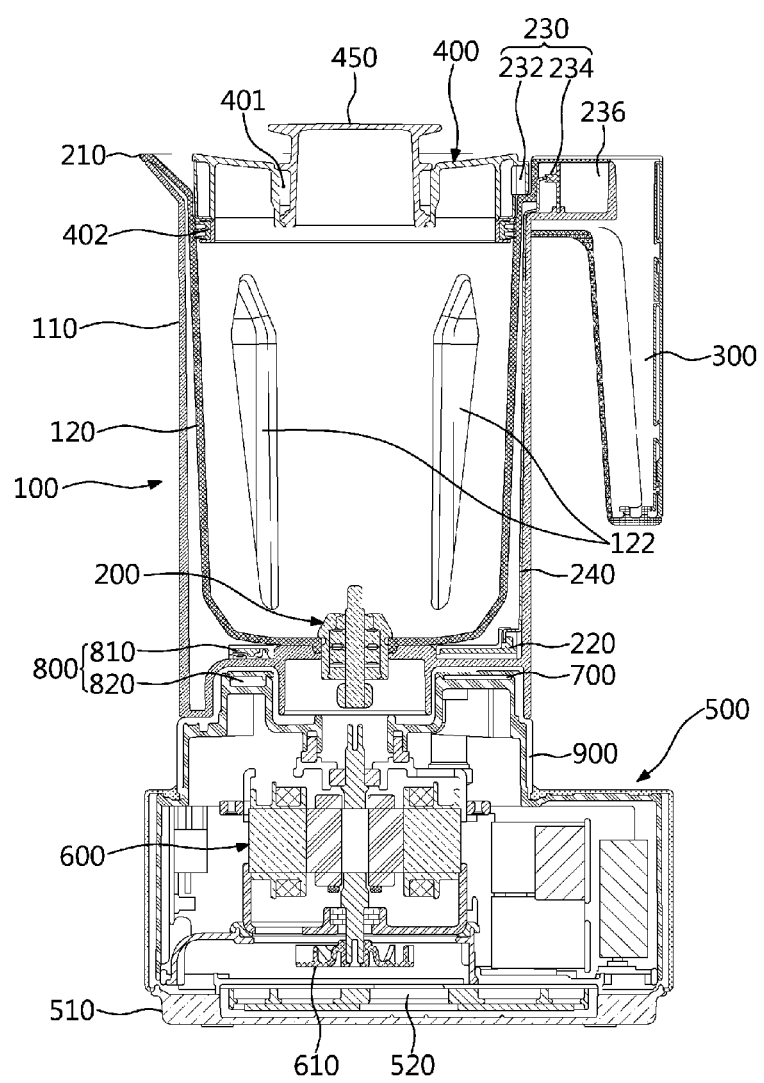
FIG. 2 is a vertical sectional view illustrating an internal configuration of the blender according to the embodiment of the present disclosure.

FIGS. 1 and 2 are a perspective view and a vertical sectional view, respectively, illustrating a configuration of the blender according to an embodiment of the present disclosure.

As illustrated in these drawings, the blender of the present disclosure may include a container body 100 located relatively at an upper side thereof and receiving food, and a main body 500 provided at a lower side of the container body 100 and supporting the container body 100.

The container body 100 may be a part in which the food is received and the process of cutting or crushing the food occurs, and the main body 500 may support the container body 100. Furthermore, multiple parts may be provided inside such a main body 500 to control the cutting or crushing of the food received in the container body 100, or to supply electric power.

The container body 100 may have a cylindrical shape as a whole, and an upper surface thereof may be configured to be open to introduce the food thereinto.

The container body 100 may be made of a transparent material such that an inside thereof can be seen from the outside. That is, the container body 100 may be made of glass or transparent plastic so that a user can check the state of the food contained inside the container body 100 from the outside.

A blade assembly 200 may be provided in an inner lower portion of the container body 100. The blade assembly 200 may have multiple blades mounted rotatably thereto such that the blades chop or crush the food received in the container body 100.

The blade assembly 200 may be connected to a motor assembly 600 to be described below, and be configured to be rotated by a rotational force generated by the motor assembly 600.

The container body 100 may be formed doubly. That is, the container body 100 may be composed of an outer container body 110 constituting the appearance thereof and an inner container body 120 provided inside the outer container body 110. When the outer container body 110 and the inner container body 120 can be configured to be in contact with each other or to be spaced apart from each other by a predetermined distance from each other, only a portion of each of the outer container body 110 and the inner container body 120 may be configured to be in contact with each other.

At least one inner guide 122 may be provided in the container body 100 to have a predetermined length in a vertical direction. The inner guides 122 are intended to guide the food rotating in the container body 100, and may be configured in pairs symmetrical to each other in the front and rear or left and right of the inner container body 120.

A handle 300 grasped by a user may be formed by protruding from a right surface of the container body 100 to the right side. Such a handle 300 may be formed such that the user can grasp the handle with one hand, and in the present disclosure, an upper end of the handle is illustrated to be connected integrally to an upper surface of the container body 100.

Meanwhile, a spout 210 may be formed at the opposite side to the handle 300.

As illustrated in the drawing, the spout 210 may be formed on the upper end of a left surface of the container body 100, and may be a part through which the food completely crushed in the container body 100 is guided to be easily poured to the outside. Accordingly, such a spout 210 may be formed to gradually more protrude in the left direction going upward.

The upper surface of the container body 100 may be covered by a container lid 400. That is, the container lid 400 may be removably mounted to the upper surface of the container body 100, and open and close the upper surface of the container body 100.

The container lid 400 may cover the upper surface of the container body 100 such that the food contained in the container body 100 does not spill to the outside and foreign matter of the outside is not introduced into the container body 100.

The container lid 400 may be configured to be mounted to the container body 100 by pressing or rotating the container lid 400 the user. A gasket 402 may be provided in an outer circumferential surface of the container lid 400 and block a gap between the container lid 400 and the container body 100. Of course, such a gasket 402 may function to allow the container lid 400 to be pressed and fitted to the container body 100.

A cap 450 may be provided in the container lid 400. That is, a lid hole 401 which is a circular hole having a predetermined size may be formed vertically through the center of the container lid 400, and the cap 450 may be mounted to such a lid hole 401 and cover the lid hole 401.

As illustrated in the drawings, the cap 450 may be installed at the center of the container lid 400, and as a whole, may be formed to have a diameter smaller than a diameter of the container lid 400. The cap 450 may be removably mounted to the container lid 400 by forcible fitting by pressing or by rotating.

In the present disclosure, it is illustrated that the cap 450 is configured to be attached and detached from the container lid 400 by being rotated, and a detailed configuration thereof will be described below.

Since the cap 450 may be removably mounted to the container lid 400, the user may see the food contained inside the container body 100 by opening only the cap 450 without opening the container lid 400, and insert food into the container body 100 by opening the cap 450, or insert a mixing rod thereinto and stir the food contained inside the container body 100.

The upper end of the cap 450 may be configured by protruding toward an upper side more than the upper end of the container lid 400, so the cap 450 may function as a handle of the container lid to be grasped by the user when the user opens or closes the container lid 400.

As illustrated in the drawings, the main body 500 may be configured to have a hexahedral shape having the shape of a rectangular barrel as a whole and be provided under the container body 100 so as to support the container body 100, wherein the motor assembly 600 and multiple electronic parts such as a PCB (a printed circuit board) may be installed inside the main body 500. Of course, the external shape of such a main body 500 may be variously changed as required.

The motor assembly 600 may be provided at a center of an inside of the main body 500. The motor assembly 600 may generate a rotational force by power supplied from the outside so that the blades constituting the blade assembly 200 rotate.

Accordingly, a lower end of the blade assembly 200 may be connected to an upper end of the motor assembly 600.

A knob 502 may be provided on a front surface of the main body 500 by protruding forward therefrom. The knob 502 is intended to set an operation of the blender of the present disclosure, and may be rotatably mounted to the main body 500.

The knob 502 may be configured to control the operation intensity of the motor assembly 600. That is, the knob 502 may be configured to change the rotational speed of the motor assembly 600 to high speed or low speed by the clockwise or counterclockwise rotation of the knob 502.

Meanwhile, a manipulation part 504 may be provided on the upper surface of the main body 500.

The manipulation part 504 is intended to manipulate the blender of the present disclosure by touching, and may be configured to manipulate the starting and stopping of the operation of the blender.

Of course, the knob 502 and the manipulation part 504 may be configured to selectively set or manipulate the operation of the blender, or may be configured to overlap with each other in the functions of the setting and manipulating. That is, for convenience, the knob 502 and the manipulation part 504 may be configured to overlap with each other in the functions such that the user may select any one of the knob 502 or the manipulation part 504 to set or manipulate the operation of the blender.

A display part 506 may be provided at a side of the manipulation part 504 (a left side in FIG. 1). That is, the display part 506 may be provided on the upper surface of the main body 500. Such a display part 506 may function to display the state of the operation of the blender such that the user can check the state thereof. Accordingly, such a display part 506 may be configured as a seven-segment display.

A cooling fan 610 may be provided at a lower side of the motor assembly 600.

The cooling fan 610 may be connected to the lower end of the motor assembly 600 and be rotated by a rotating force generated by the motor assembly 600, thereby introducing an outside air into the main body 500 and forcing the flow of the air. Accordingly, the cooling fan 610 may allow air to be introduced into the main body 500 from the outside and to flow therein, and function to cool parts such as the PCB provided in the main body 500.

A base end 510 may be provided on the lower surface of the main body 500.

The base end 510 may be formed by protruding downward from the lower surface of the main body 500 and may have a space having a predetermined size therein to receive a wireless power module 520. The wireless power module 520 may function to receive external wireless power in a wireless method using induced electromotive force and to supply the wireless power to the motor assembly 600 provided inside the main body 500.

Meanwhile, a detection system may be provided in the main body 500 and the container body 100 described above so as to detect whether the container lid 400 is mounted to the container body 100.

The detection system may allow an electric circuit (not shown) which can be turned on and off to be formed in the container body 100, and allow such an electric circuit to form a closed circuit, so that the detection system may be configured to detect whether electric current flows in the closed circuit by voltage supplied by the main body 500.

More particularly, the detection system may include: a power transmission part 700 provided in the main body 500 and supplying power to the container body 100; a power reception part 220 provided in the container body 100 and receiving the power supplied by the power transmission part 700; an on/off part 230 provided at the upper side of the container body 100 and turning on/off the electric circuit formed in the container body 100 depending on whether the container lid 400 is closed; a transparent electrode film 240 made of a transparent material provided on a surface of the container body 100 and connecting the power reception part 220 and the on/off part 230 to each other so as to allow electricity to flow therebetween; and a detection part 800 provided on one side of the main body 500 or the container body 100 and allowing the electric circuit formed by the connection of the power reception part 220 with the on/off part 230 to form the closed circuit so as to detect whether the current flows.

The power transmission part 700 is intended to transmit power, which is introduced to the main body 500 from the outside of the main body 500 or stored in advance in the main body 500, to the container body 100, and may use an induction coil in which the induced electromotive force can be generated.

The power reception part 220 is intended to receive the power transmitted from the main body 500, and may be configured to have a structure corresponding to the structure of the power transmission part 700. That is, the power reception part 220 may use the coil such that the power is transmitted by the induced electromotive force generated between the power transmission part 700 and the power reception part 220.

The power transmission part 700 and the power reception part 220 may be located to be adjacent to each other so as to generate the induced electromotive force. Accordingly, in the present disclosure, the power transmission part 700 is illustrated to be mounted to the right upper end of the main body 500, and the power reception part 220 is illustrated to be mounted to the right lower end of the container body 100.

The on/off part 230 may be configured to turn on/off the electric circuit (not shown) formed in the container body 100 depending on whether the container lid 400 is mounted to the container body 100, and may include a permanent magnet 232 and a reed switch 234 provided in the container lid 400 and the container body 100, respectively.

As illustrated in FIG. 2, in the present disclosure, the permanent magnet 232 is illustrated to be mounted to the right edge of the container lid 400, and the reed switch 234 is illustrated to be mounted to the right upper end (a portion of the handle) of the container body 100.

More particularly, the reed switch 234 may be mounted to be received in a reed switch groove 236 formed in the upper end portion of the handle 300.

It is widely known that the reed switch has magnetic movable contacts enclosed in a glass tube, and when a magnet approaches the reed switch, the contacts in the glass tube are turned on. Here, further detailed description of the configuration and principle of the reed switch will be omitted.

Of course, except for the use of the permanent magnet 232 and the reed switch 234 of such an on/off part 230, other electric on/off part or mechanical structures may be used to turn on/off the electric circuit, and the mounting positions of the permanent magnet 232 and the reed switch 234 respectively mounted to the container lid 400 and the container body 100 may be exchanged oppositely.

Various types of electrical devices or structures having a function that can detect whether electric current flows in the electric circuit formed in the container body 100 turned on/off by the on/off part 230 may be used as the detection part 800. However, in the present disclosure, a photosensor is used to detect light as an example.

Accordingly, the detection part 800 may include a signal transmission part 810 provided in the container body 100 to generate light, and a signal reception part 820 provided in the main body 500 to receive the light transmitted by the signal transmission part 810.

The signal transmission part 810 and the signal reception part 820 may be located at positions adjacent to each other. In the present disclosure, as illustrated in FIG. 2, the signal transmission part 810 may be located on the left lower end of the container body 100, and the signal reception part 820 may be located on the left upper end of the main body 500.

The signal transmission part 810 may use an LED (light emitting diode) that emits light by electricity, and the signal reception part 820 may use the photosensor that receives light and changes the light into an electrical signal. That is, a light transmission module provided with an LED configured to generate light by electricity may be used as the signal transmission part 810, and a light reception module configured to convert light received by a photosensor into an electrical signal may be used as the signal reception part 820.

In addition, the transparent electrode film 240 may be provided between the outer container body 110 and the inner container body 120. More particularly, the transparent electrode film 240 may be attached to the inner surface of the outer container body 110.

The transparent electrode film 240 may be made of a transparent material such as an ITO film (an indium-tin oxide film) and may be attached to the surface of the container body 100, and may allow the on/off part 230 provided on the upper side of the container body 100 to be connected to the power reception part 220 and the signal transmission part 810 provided on the lower end portion of the container body 100 so as to form the electric circuit.

Accordingly, the transparent electrode film 240 may be attached vertically and longitudinally on the surface of the container body 100 made of a transparent material and may function to guide the transmission of the electrical signal between the upper end and lower end of the container body 100.

Accordingly, when the container body 100 is made of the transparent material, and the transparent electrode film 240 is also made of the transparent material, the transparent electrode film 240 may not be visually exposed, so the transparent material does not spoil the appearance of the container body 100 and may maintain the design thereof.

Furthermore, when the transparent electrode film 240 is attached to the surface of the container body 100, the transparent electrode film 240 may have a hole formed therein to remove air bubbles that may be generated between the attached surfaces. That is, a perforated hole may be added to the center of the transparent electrode film 240 made of the ITO film to allow the air bubbles to escape therethrough such that the generation of the air bubbles is prevented.

Meanwhile, a seating step 900 may be formed on the upper surface of the main body 500 by protruding upward therefrom.

The seating step 900 may be configured to have a circular shape corresponding to a shape of the lower end of the container body 100 such that the lower end of the container body 100 is mounted to the seating step 900 to be vertically removed therefrom.

In addition, the container body 100 may be formed doubly. That is, the container body 100 may be composed of the outer container body 110 and the inner container body 120, and the inner guide 122 may be formed on the inner surface of the inner container body 120 by protruding inward therefrom.

Hereinafter, the configuration of the container body 100 will be described in detail.

Figure 3:
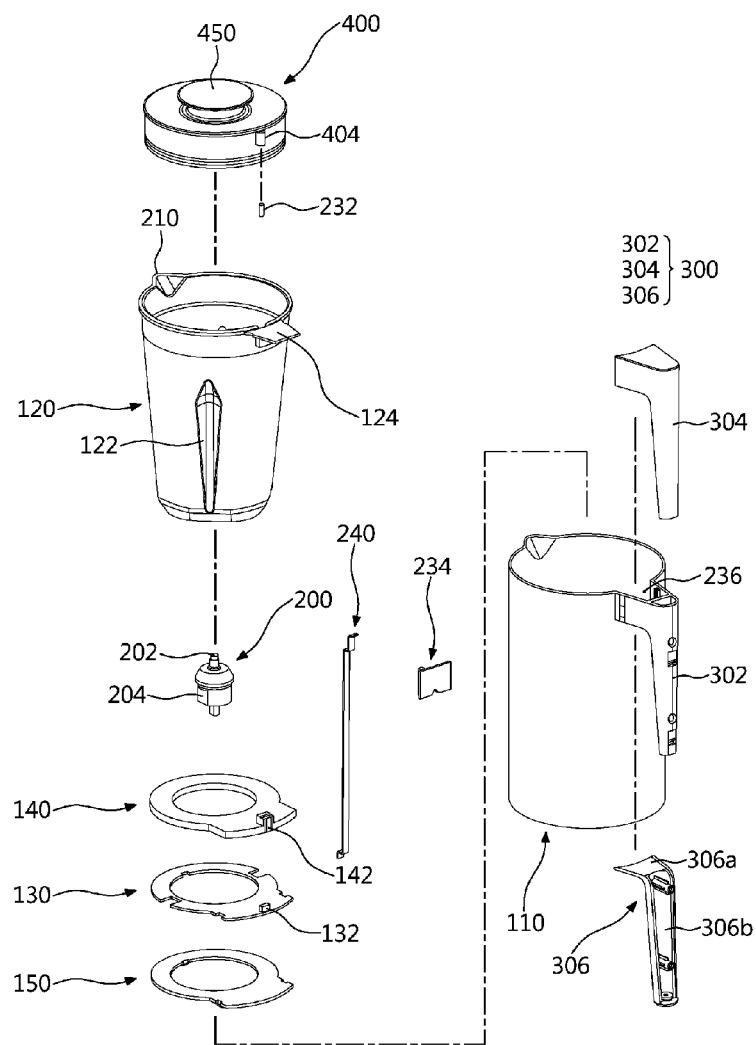
FIG. 3 is an exploded perspective view illustrating a detailed configuration of a container body according to an embodiment of the present disclosure
Figure 4:
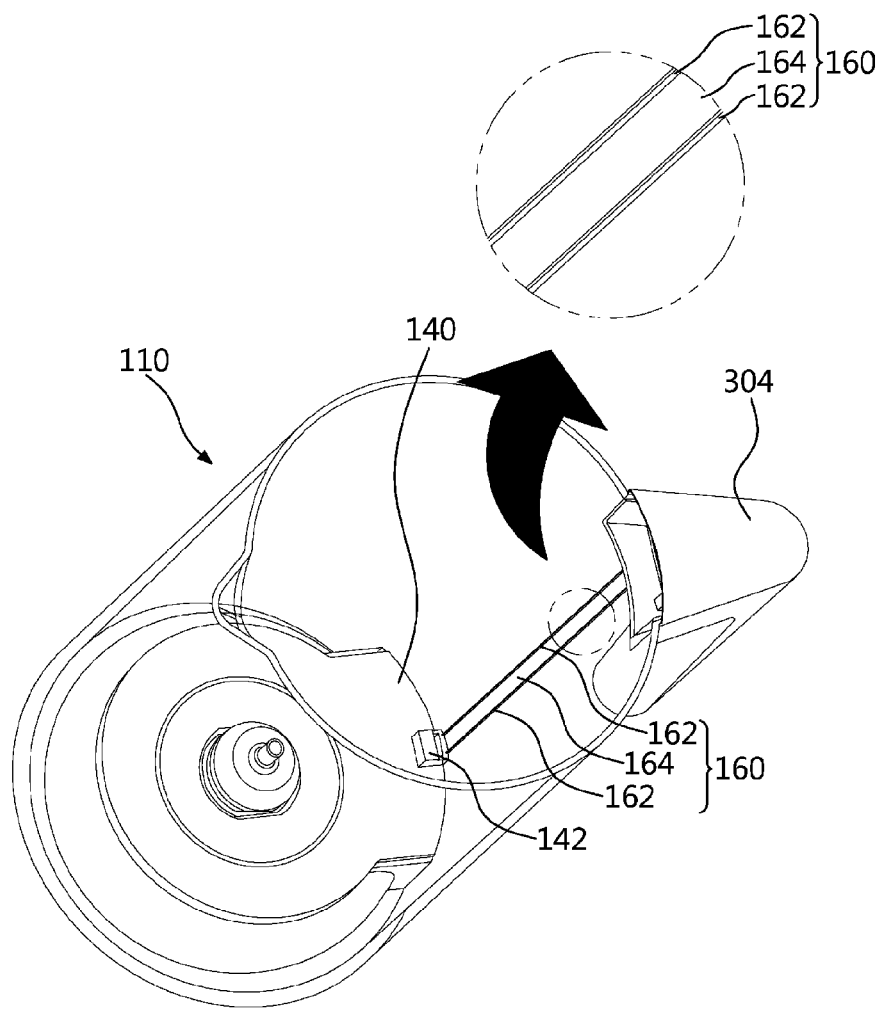
FIG. 4 is a perspective view illustrating a configuration of an outer container body constituting the blender according to an embodiment of the present disclosure.
Figure 5:
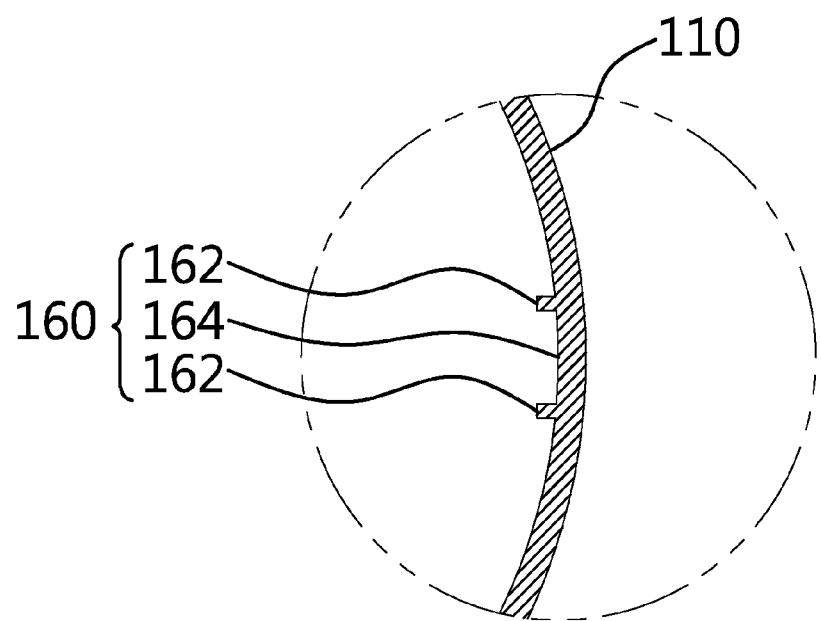
FIG. 5 is a partial cross-sectional view illustrating a detailed configuration of a film guide of the outer container body constituting the blender according to the embodiment of the present disclosure.

In FIGS. 3 to 15, a configuration of each of the container body 100 and the container lid 400 is illustrated in detail. That is, FIG. 3 illustrates an exploded perspective view of the container body 100, FIG. 4 illustrates a perspective view of a configuration of an outer container body constituting the blender according to the embodiment of the present disclosure, and FIG. 5 illustrates a partial cross-sectional view showing a detailed configuration of a film guide of the outer container body constituting the blender according to the embodiment of the present disclosure.

Figure 6:
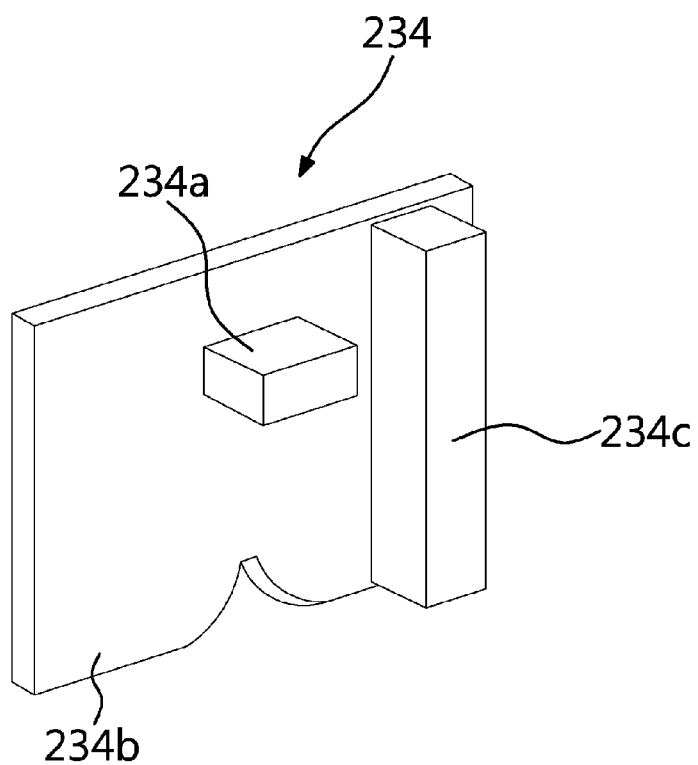
FIG. 6 is a perspective view illustrating a detailed configuration of a reed switch constituting the blender according to an embodiment of the present disclosure.
Figure 7:
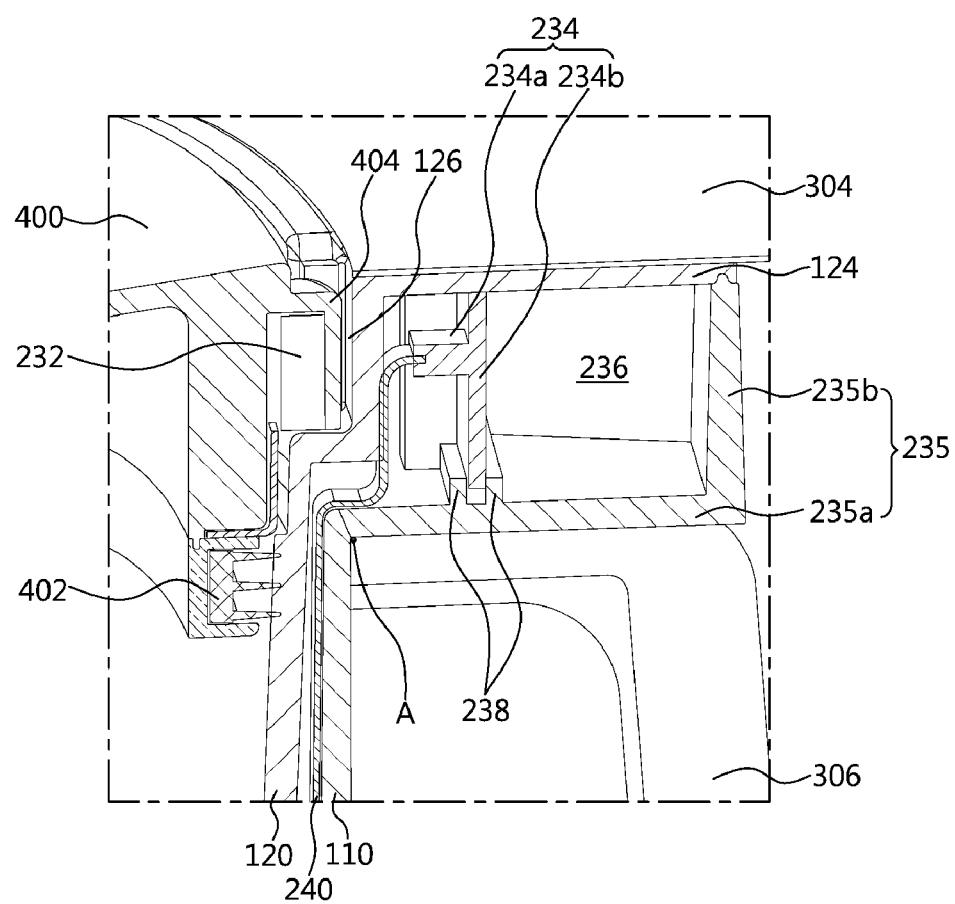
FIG. 7 is a partial sectional view illustrating a mounted state of the reed switch constituting the blender according to the embodiment of the present disclosure.
Figure 8:
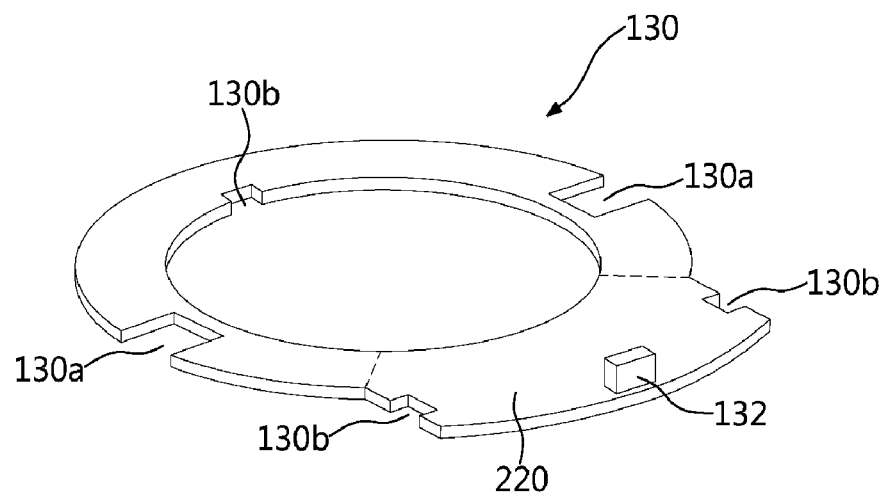
FIG. 8 is an upper perspective view of a coil holder constituting the blender according to an embodiment of the present disclosure.
Figure 9:
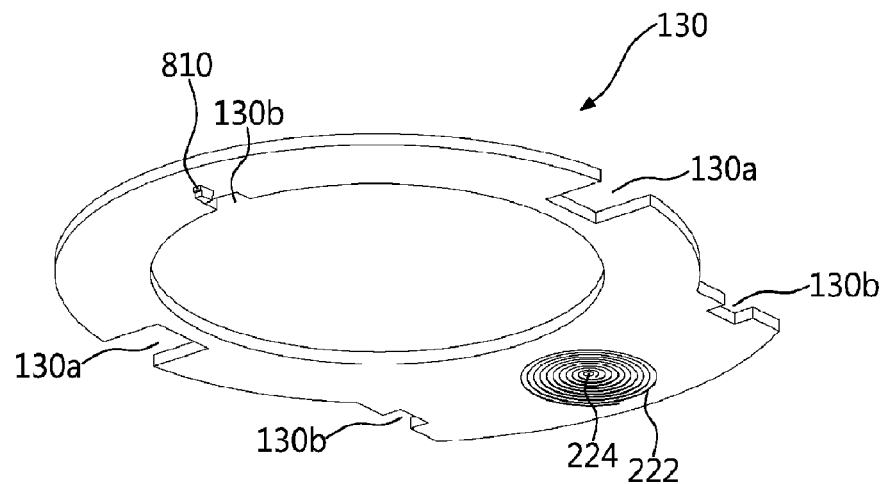
FIG. 9 is a lower perspective view of the coil holder constituting the blender according to the embodiment of the present disclosure.

In addition, FIGS. 6 and 7 illustrate a perspective view of a detailed configuration of a reed switch constituting the blender according to the embodiment of the present disclosure and a partial sectional view of a mounted state of the reed switch, respectively, and FIGS. 8 and 9 illustrate upper and lower perspective views, respectively, of a configuration of a coil holder.

Figure 10:
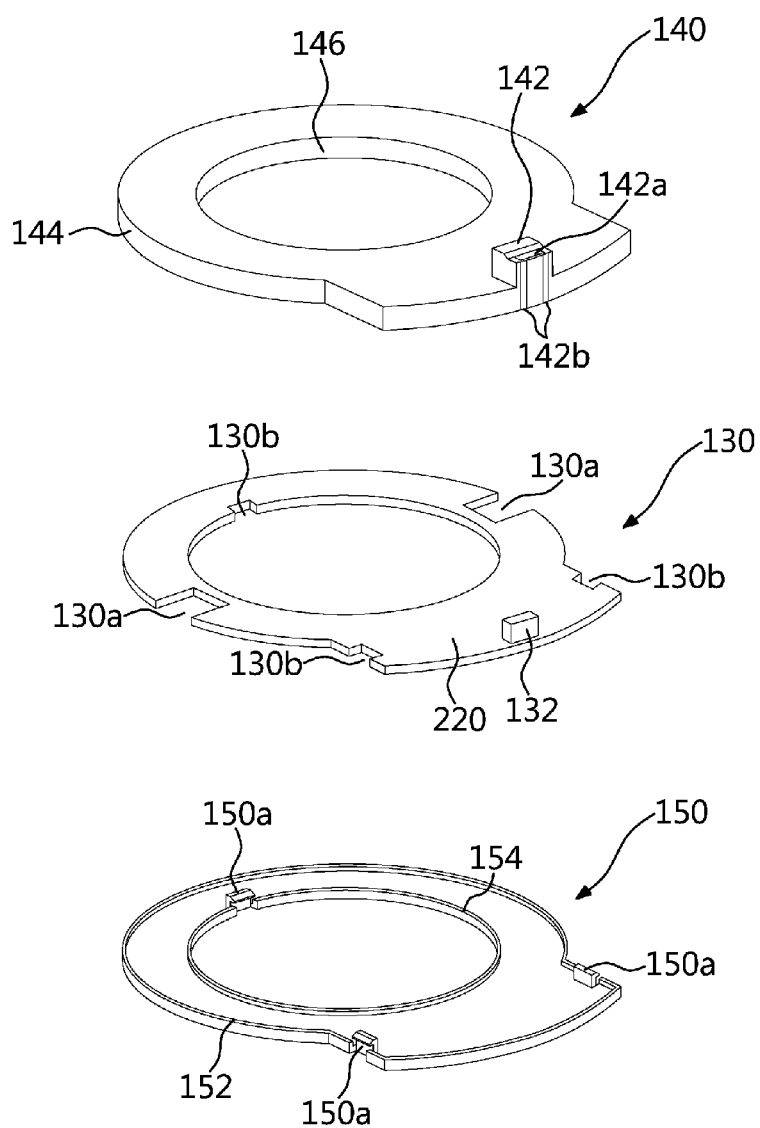
FIG. 10 is an upper exploded perspective view illustrating a detailed configuration of a coil holder assembly constituting the blender according to an embodiment of the present disclosure.
Figure 11:
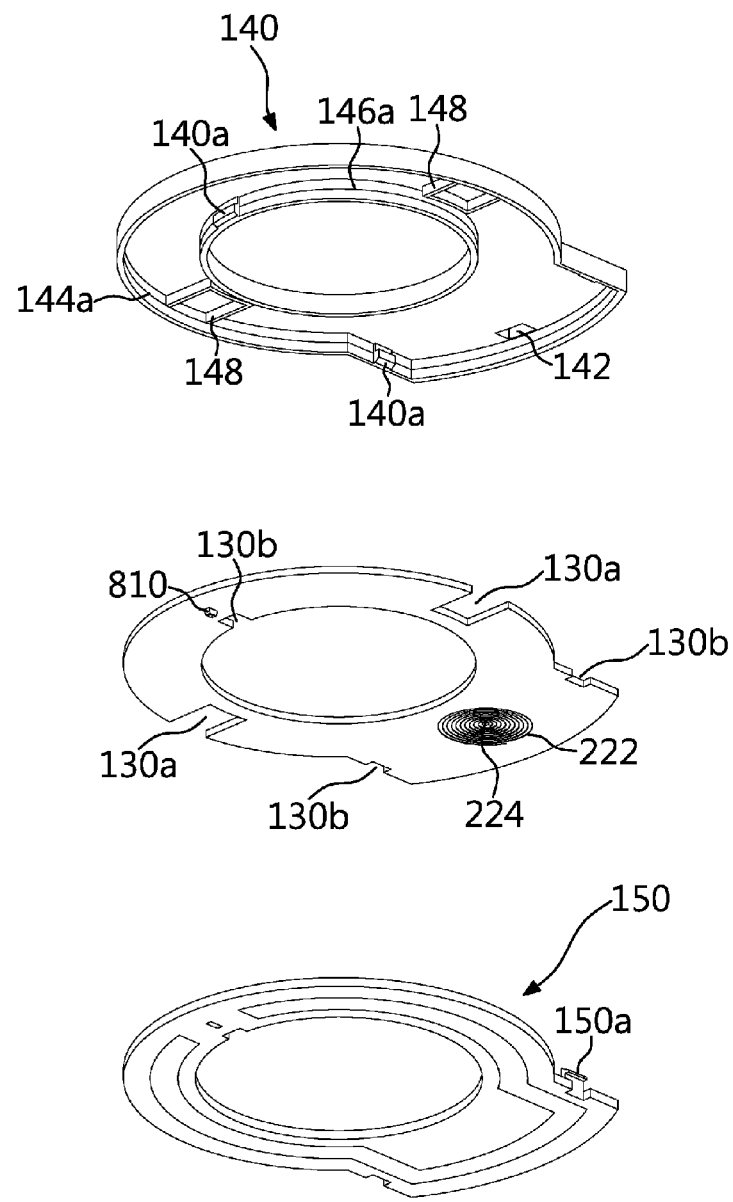
FIG. 11 is a lower exploded perspective view illustrating a detailed configuration of the coil holder assembly constituting the blender according to the embodiment of the present disclosure.
Figure 12:
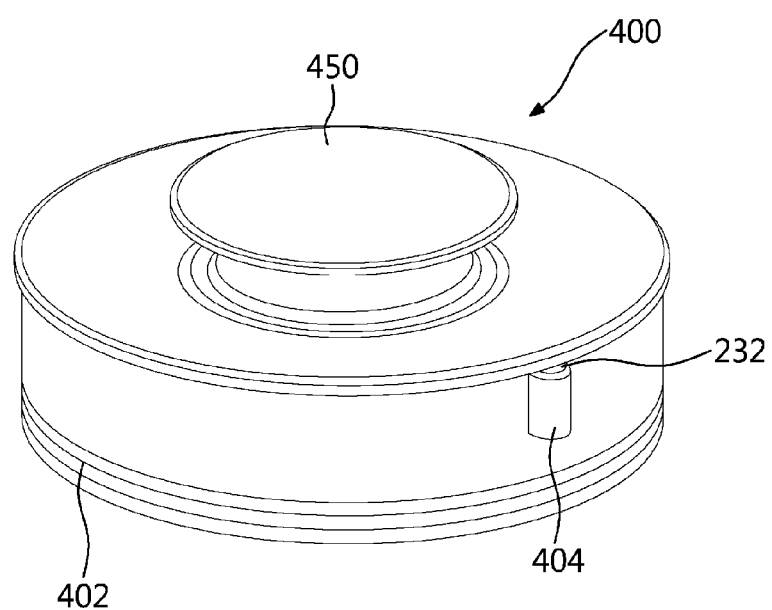
FIG. 12 is a perspective view of a container lid constituting the blender according to an embodiment of the present disclosure.
Figure 13:
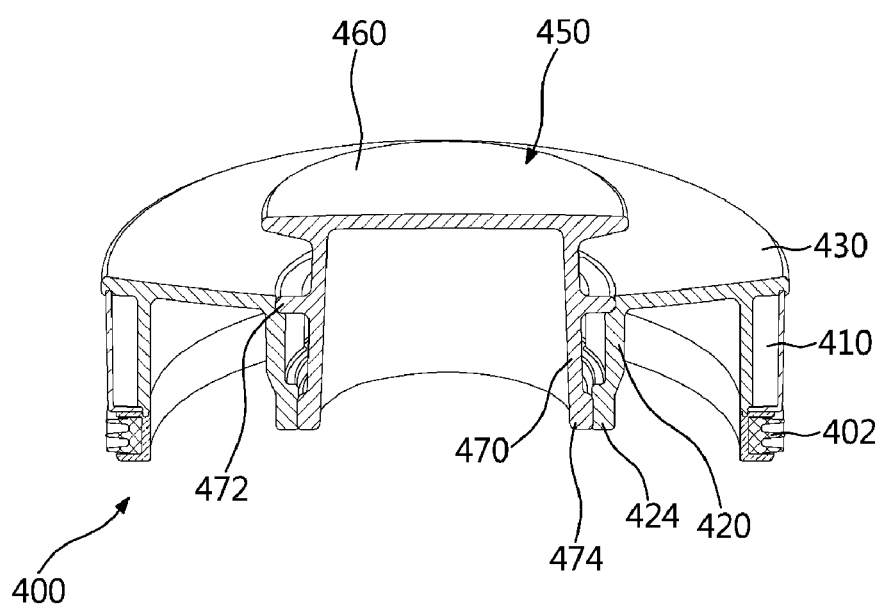
FIG. 13 is a cut-away perspective view of the container lid constituting the blender according to the embodiment of the present disclosure.
Figure 14:
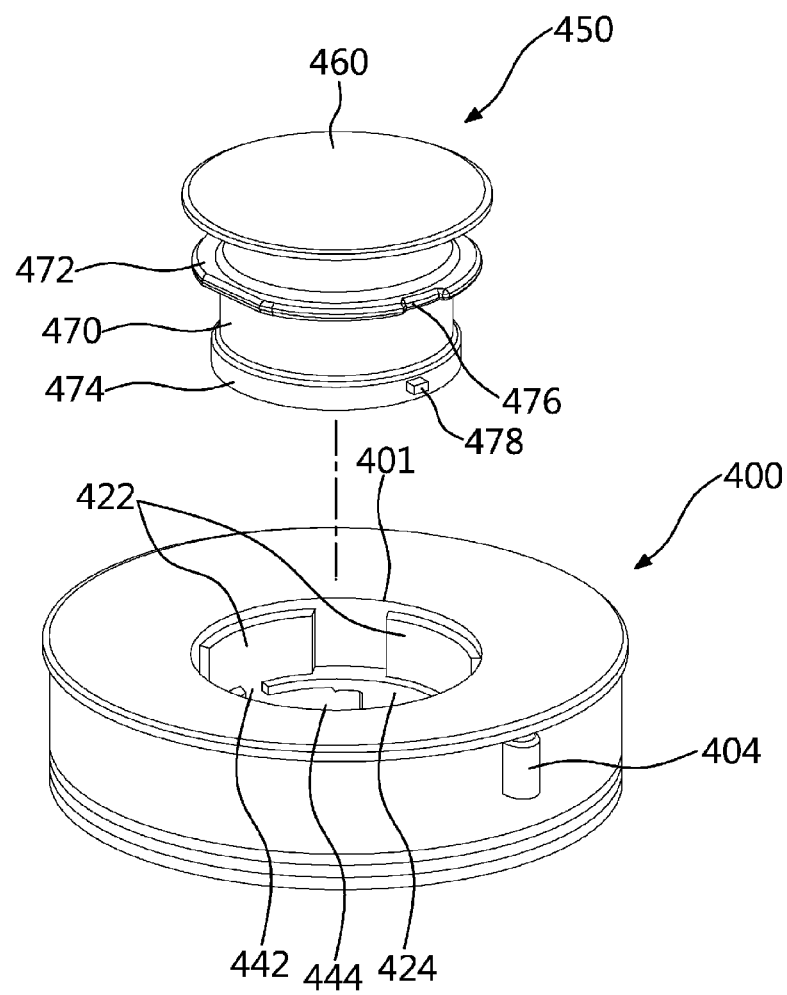
FIG. 14 is an exploded perspective view of the container lid constituting the blender according to the embodiment of the present disclosure.
Figure 15:
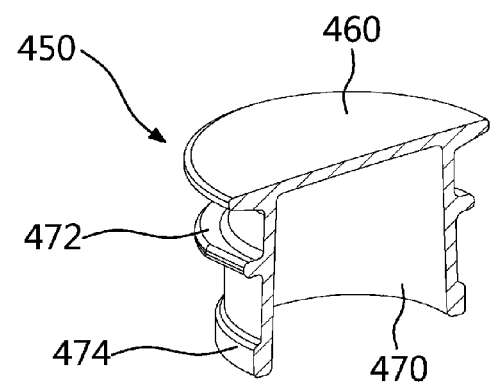
FIG. 15 is an exploded cut-away perspective view of the container lid constituting the blender according to the embodiment of the present disclosure.
Figure 15:
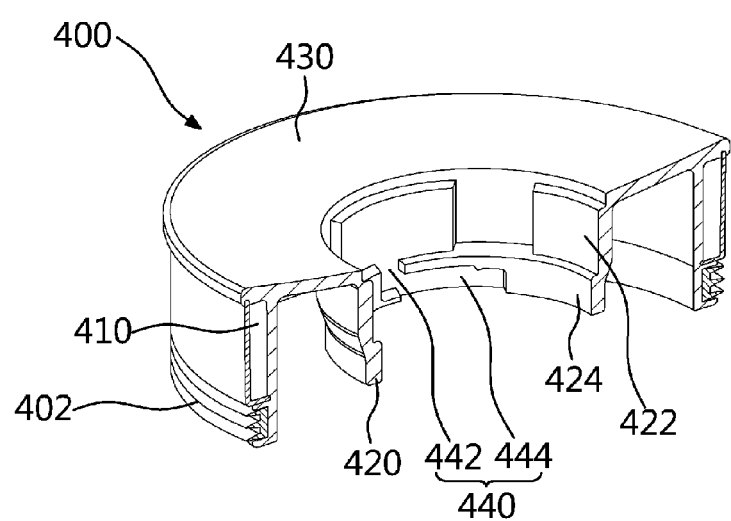
Figure 16:
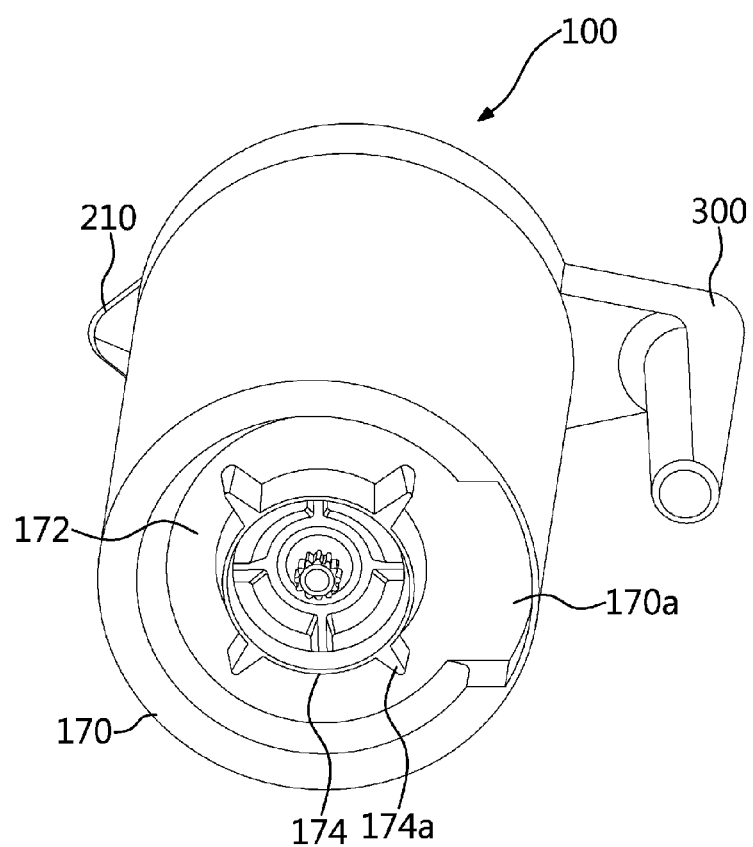
FIG. 16 is a lower perspective view of the container body constituting the blender according to an embodiment of the present disclosure.

In addition, FIGS. 10 and 11 illustrate upper and lower exploded perspective views, respectively, of a detailed configuration of a coil holder assembly constituting the blender according to the embodiment of the present disclosure, FIGS. 12 and 13 illustrate a perspective view and a cut-away perspective view of a container lid 400, respectively, and FIGS. 14 and 15 illustrate an exploded perspective view and an exploded cut-away perspective view, respectively, of the container lid 400. FIG. 16 is a lower perspective view of a container body 100.

As illustrated in these drawings, the container body 100 may be doubly configured to have a cylindrical shape as a whole. That is, the container body 100 may include an outer container body 110 constituting the appearance thereof, and an inner container body 120 provided inside the outer container body 110.

The container body 100, that is, the outer container body 110 and the inner container body 120 may be made of a transparent material. That is, the container body 100 may be made of a transparent material such as glass, Tritan, or transparent plastic so that a user can check the state of the food contained inside the container body 100 from the outside.

The outer container body 110 may constitute the appearance of the container body, and be configured to have a cylindrical shape with the same top and bottom sizes, and a main handle 302 may be formed at the outer right surface thereof by protruding therefrom to the right such that a user can grasp the handle.

The main handle 302 may be formed to have an L shape, and the upper end portion thereof may be connected to the right upper end of the outer container body 110. The main handle 302 may be formed integrally with the outer container body 110 by injection molding. Accordingly, the main handle 302 formed integrally with the outer container body 110 may have improved strength and durability compared to the main handle formed as a part separate from the outer container body 110 to be fixed thereto.

A mounting end 235 having predetermined space therein may be formed at a portion at which the main handle 302 is connected to the container body 100. The mounting end 235 may be a part in which the reed switch 234 is installed.

The reed switch groove 236 receiving the reed switch 234 may be formed inside the mounting end 235. That is, the reed switch groove 236 may be formed in the upper end of the main handle 302, and may provide a space to mount the reed switch 234 therein, and the left of such a reed switch groove 236 may be open.

More specifically, the mounting end 235 may include a bottom surface 235a formed by bending vertically to a side from the side surface of the outer container body 110 and extending, and a side surface 235b formed by bending vertically upward from the right end of the bottom surface 235a and extending.

Accordingly, the reed switch groove 236 having a predetermined size may be formed at the upper side of the bottom surface 235a, and the upper portion of the reed switch groove may be covered by a covering end 124 extending laterally from the upper end of the inner container body 120, and the left of the reed switch groove may be open such that the transparent electrode film 240 can connect to the reed switch.

A pair of mounting ribs 238 spaced apart by a predetermined distance from each other may be formed on the bottom surface 235a by protruding upward therefrom such that the pair of mounting ribs have predetermined heights, and the reed switch 234 may be fixedly mounted between the pair of mounting ribs 238.

Specifically, the reed switch 234 may be composed of a switch part 234a provided with a switch, and a support piece 234b supporting the switch part 234a.

As illustrated in FIG. 7, the support piece 234b may be configured as a flat plate having a predetermined thickness, and may be vertically installed in the reed switch groove 236 so as to fixedly support the switch part 234a. That is, the lower end of the support piece 234b may be fitted and held between the pair of mounting ribs 238. Accordingly, the lower end of the support piece 234b is preferably configured to have a size corresponding to a gap between the pair of mounting ribs 238.

More preferably, the lower end of the support piece 234b may be forcibly fitted into the gap between the pair of mounting ribs 238.

As illustrated in FIG. 7, the switch part 234a may be installed by protruding leftward from the support piece 234b, and the upper end of the transparent electrode film 240 may be connected to the left end of such a switch part 234a.

In addition, a support protrusion 234c may be formed on an end of the support piece 234b. As illustrated in FIG. 6, the support protrusion 234c may be formed by protruding by a predetermined height from the left or right end of the support piece 234b such that the reed switch 234 can be easily mounted to the mounting end 235 or the covering end 124 of the inner container body 120.

An outer handle 304 and an inner handle 306 may be provided on the outer sides of the main handle 302. That is, as illustrated in FIG. 3, the outer handle 304 may be provided at the right of the inner handle 306, and the inner handle 306 may be provided at the left of the main handle 302.

More particularly, the outer handle 304 may also be configured to have an L shape as a whole as does the main handle 302, so as to cover the upper surface, right surface, and front and rear surfaces of the main handle 302. The outer handle 304 may be made of a material such as stainless steel that has a smooth surface and is resistant to rust, and may not break easily and look beautiful to a user.

The inner handle 306 may cover the left surface and lower surface of the main handle 302, and may be configured to have an L shape so as to correspond to the left and lower surfaces of the main handle 302, and at least a portion thereof may be made of an elastic material.

Particularly, the inner handle 306 may include a connection part 306a covering the lower part of the upper end of the main handle 302, and a grasping part 306b extending downward from the connection part 306a and covering the left surface of the main handle 302.

Like the outer handle 304, the connection part 306a may be made of a smooth and strong material, and the grasping part 306b may be a part on which a user's fingers are wrapped, and be made of an elastic material. That is, the connection part 306a may be made of stainless steel, and the grasping part 306b may be made of an elastic material such as rubber that can give a user a soft touch since the four fingers (except for the thumb) of the user cover the grasping part.

The inner container body 120 may be configured to have a size (a diameter) smaller than a size (a diameter) of the outer container body 110 and may sit inside the outer container body 110.

The inner container body 120 may be configured to have a cylindrical shape having an open upper part. More particularly, as illustrated in the drawings, the inner container body 120 may be configured to have a tapered shape having a diameter gradually decreasing going toward the lower side thereof.

In addition, the multiple inner guides 122 may be vertically formed on the inner surface of such an inner container body 120 as described above, and the blade assembly 200 may be mounted to the lower end of the inner container body 120.

The spout 210 may be formed on the left upper end of the inner container body 120 by protruding therefrom to the left, and the covering end 124 may be formed on the right upper end of the inner container body 120 by extending therefrom to the right.

The covering end 124 may cover the upper surface of the reed switch groove 236 of the outer container body 110. The covering end 124 may be configured to be a flat plate having a predetermined thickness, and to have width gradually decreasing going toward the right to correspond to the size of the upper end of the reed switch groove 236.

The blade assembly 200 may be mounted to the lower end of the inner container body 120.

The blade assembly 200 is intended to allow food to be finely crushed or mixed by the blades, and may include: a blade shaft 202 rotated by receiving the rotational force generated from the motor assembly 600; a blade body 204 provided at the outside of the blade shaft 202 and supporting the blade shaft 202; and at least one blade connected to the blade shaft 202 and crushing the food by rotating.

The coil holder assembly may be provided between the outer container body 110 and the inner container body 120.

The coil holder assembly may include a coil holder 130 having an induction coil, and an upper cover 140 and a lower cover 150 covering the upper and lower sides of the coil holder 130, respectively.

Particularly, the coil holder 130 may be provided between the bottom surface of the outer container body 110 and the lower surface of the inner container body 120, and the power reception part 220 and the signal transmission part 810 may be mounted to such a coil holder 130.

The entirety of the coil holder 130 may have the shape of a circular ring having a predetermined thickness, and the power reception part 220 may be provided at the right end of the coil holder 130 having such a ring shape. That is, although not shown in detail, the induction coil which receives power may be provided at the right end of the coil holder 130, and constitute the power reception part 220.

The power reception part 220 mounted to the coil holder 130 may be embodied with a reception induction coil patterned on the same plane as the PCB. That is, as illustrated in the drawing (see FIG. 9) in the power reception part 220 according to the embodiment of the present disclosure, the reception induction coil provided on the lower surface of the coil holder 130 may be configured to be wound multiple times on the PCB in a spiral shape relative to a reception center point 224.

In addition, the signal transmission part 810 may be provided on the lower surface of the coil holder 130.

The signal transmission part 810 may emit light by power supplied from the power reception part 220. The signal transmission part 810 may be configured as a part of the detection part 800, and use the LED emitting light as described above.

The power reception part 220 and the signal transmission part 810 may be electrically connected to each other. That is, the power reception part 220 and the signal transmission part 810 may be configured to form the closed circuit in cooperation with the on/off part 230. Accordingly, the power reception part 220 and the signal transmission part 810 provided in the coil holder 130, and the on/off part 230 may be configured to be electrically connected to each other by the PCB.

As illustrated in the drawing, the power reception part 220 and the signal transmission part 810 may be installed on the right and left ends, respectively, of the coil holder 130 such that the power reception part 220 and the signal transmission part 810 are spaced apart from each other, and may be configured to be electrically connected to each other by a printed circuit board. Furthermore, the power reception part 220 and the signal transmission part 810 may be installed on any one of the right and left ends of the coil holder 130 and may be configured such that the power reception part 220 and the signal transmission part 810 are close to each other.

In addition, although not shown, the coil holder 130 may further include a conversion module that converts alternating current (AC) to direct current (DC).

The transparent electrode film 240 may be connected to the coil holder 130. That is, an end of the transparent electrode film 240 constituting the detection system may be connected to an end of the coil holder 130.

Specifically, a holder terminal 132 may be provided on the upper surface of the right end of the coil holder 130, and such a holder terminal 132 may be a part to which the lower end of the transparent electrode film 240 is inserted and connected.

As illustrated in FIG. 3, the coil holder 130 may be configured to have an approximate ring shape as a whole, and the right end of the coil holder 130 may be configured to be relatively large in width such that the power reception part 220 may be mounted thereto.

Accordingly, when the coil holder 130 is configured in a ring shape, a hole may be formed in the center portion of the coil holder 130 by passing vertically therethrough, and thus may provide a path through the blade assembly 200 and the motor assembly 600 are connected to each other. That is, without the interference of the motor assembly 600 with the coil holder 130, the power of the motor assembly 600 may be transmitted to the blade assembly 200.

Multiple grooves may be formed in the outer and inner circumferential surfaces of the coil holder 130. Specifically, a holding groove 130a may be formed in each of the front end rear ends of the coil holder 130 by being recessed inward therefrom, and a hook passing groove 130b may be formed in each of the front and rear of the right end of the coil holder 130 and the inner side of a left end thereof.

The holding groove 130a may be a part through which a holding guide piece 148 to be described below is received and passes, and the hook passing groove 130b may be a part through which an upper hook 140a or a lower hook 150a to be described below is received or passes.

The coil holder 130 may be protected by the upper cover 140 and the lower cover 150. That is, the upper cover 140 and the lower cover 150 may be provided on the upper surface and lower surface of the coil holder 130, respectively, so as to cover the upper surface and lower surface thereof, the upper cover and lower cover having shapes corresponding to the upper surface and lower surface of the coil holder 130, respectively.

A terminal holder 142 may be formed on the right end of the upper cover 140 by protruding upward therefrom to receive the holder terminal 132 of the coil holder 130 therein. Accordingly, the holder terminal 132 may be received in the terminal holder 142 by being introduced thereto from the lower side of the terminal holder 142, and the upper part of such a terminal holder 142 may be formed to be partially open and may have a film hole 142a formed vertically through the terminal holder 142 such that the lower end of the transparent electrode film 240 passes therethrough.

The upper cover 140 may be configured to cover the coil holder 130. Accordingly, an upper edge 144 may be formed on an outer circumferential surface of such an upper cover 140 by vertically bending downward and extending. The upper edge 144 may be configured to have a predetermined height and may cover the side surface of the coil holder 130.

In addition, the upper cover 140 may also be configured to have a shape of a ring like the shape of the coil holder 130, and an upper hole edge 146 may be formed in a center hole of the upper cover 140 by extending downward, the upper hole edge corresponding to the upper edge 144.

The upper edge 144 and the upper hole edge 146 are formed to be stepped. That is, as illustrated in FIG. 11, an edge step part 144a formed to be stepped may be formed on the inner surface of the upper edge 144, and a hole step part 146a formed to be stepped may be formed on the outer circumferential surface of the upper hole edge 146. The edge step part 144a and the hole step part 146a may be parts on which a lower edge 152 and a lower hole edge 154, respectively, of the lower cover 150 to be described below are seated.

A pair of rib grooves 142b may be formed on the right surface of the terminal holder 142 by being recessed leftward. That is, as illustrated in FIG. 10, the pair of rib grooves 142b may be formed on each of the right surface of the terminal holder 142 and the right surface of the upper edge 144, and such rib grooves 142b may be parts in which a pair of guide ribs 162 to be described below is received.

The holding guide piece 148 may be formed on the lower surface of the upper cover 140 by protruding downward therefrom. That is, a pair of holding guide pieces 148 may be formed on the front and rear of the lower surface of the upper cover 140 by protruding by predetermined heights downward therefrom. Such holding guide pieces 148 are intended to support the coil holder 130 such that the coil holder 130 is securely held.

Of course, such holding guide pieces 148 may be formed on the lower cover 150 in addition to the upper cover 140, and may be formed on the left and right of the upper cover 140 in addition to the front and rear of the upper cover 140. Alternatively, one holding guide piece may be formed, and each of the holding guide pieces may be formed in various shapes such as quadrangular and circular shapes.

A hook may be formed on the upper cover 140 such that the upper cover 140 is coupled to the lower cover 150. That is, as illustrated in FIG. 11, at least one upper hook 140a may be formed on each of the upper edge 144 and the upper hole edge 146. Specifically, the upper hook 140a is illustrated to include three upper hooks, and may be formed on each of the left end of the upper hole edge 146 and the front and rear of the right end of the upper edge 144.

The lower cover 150 may also have a ring shape as a whole like the upper cover 140, and the outer edge of the lower cover 150 may bend vertically upward to constitute the lower edge 152, and the inner hole edge of the lower cover may protrude upward to constitute the lower hole edge 154.

The lower edge 152 and the lower hole edge 154 may be configured to have heights smaller than heights of the upper edge 144 and the upper hole edge 146, and may be parts which are in contact with the edge step part 144a and the hole step part 146a, respectively, formed in the upper cover 140 to be coupled thereto.

Three lower hooks 150a may be formed on the lower cover 150 by protruding upward therefrom. The lower hooks 150a may be coupled to the upper hooks 140a, respectively, such that the upper cover 140 and the lower cover 150 are securely coupled to each other. Accordingly, the upper hooks 140a and the lower hooks 150a may have shapes corresponding to each other, and may be formed at upper and lower positions, respectively, corresponding to each other.

As described above, the transparent electrode film 240 may be made of a transparent material such as the ITO film, and may be configured to have length corresponding to the vertical length of the container body 100.

The transparent electrode film 240 may be provided between the outer container body 110 and the inner container body 120. Accordingly, when the transparent electrode film 240 is provided between the outer container body 110 and the inner container body 120, the transparent electrode film 240 may be prevented from coming in contact with the food contained in the inner container body 120, and may be prevented from coming in contact with foreign matter outside of the outer container body 110.

The transparent electrode film 240 may be attached to the surface of the outer container body 110, or the surface of the inner container body 120. That is, the transparent electrode film 240 may be attached to the inner surface of the outer container body 110 or the outer surface (an outer circumferential surface) of the inner container body 120.

Here, the transparent electrode film 240 attached vertically to the inner surface of the outer container body 110 will be described as an example.

As is illustrated in FIG. 3, the upper and lower ends of the transparent electrode film 240 may be bent at least one time. The lower end of the transparent electrode film 240 may pass through the terminal holder 142 of the upper cover 140 and be connected to the holder terminal 132 of the coil holder 130, and the upper end of the transparent electrode film 240 may be connected to the reed switch 234.

The film guide 160 may be formed vertically on the inner surface of the outer container body 110 to attach the transparent electrode film 240 thereto. That is, as illustrated in the drawing, the film guide 160 may be formed vertically and longitudinally on the right inner surface of the outer container body 110 and may guide the attachment of the transparent electrode film 240.

The film guide 160 may be composed of the pair of guide ribs 162 formed by protruding to a side from the surface (an inner surface) of the outer container body 110, and a guide surface 164 formed between the pair of guide ribs 162.

As illustrated in FIG. 5, the guide ribs 162 may be configured as a pair of ribs having predetermined heights, and may be vertically formed to be parallel to each other such that a predetermined width is defined between the pair of ribs.

In addition, the guide surface 164 may be formed between the pair of guide ribs 162, and is preferably configured as a flat surface. That is, since the inner container body 120 and the outer container body 110 have circular cross-sections, the side surface of the outer container body 110 may have a predetermined curvature. However, the guide surface 164 may be configured to have a flat surface.

Accordingly, the guide surface 164 may be configured as a flat surface such that the transparent electrode film 240 is easily attached to the guide surface 164. That is, in order to easily attach the transparent electrode film 240 having a flat surface to the guide surface, the guide surface 164 is also preferably configured as a flat surface.

Meanwhile, the guide surface 164 may be formed by protruding from a side (an inner side) of the surface (the inner surface) of the outer container body 110 or by being recessed therefrom. That is, the guide surface 164 formed on the inner side surface of the outer container body 110 may be configured to have the same plane as the inner side surface of the outer container body 110, but may be formed by protruding from the inner side of the inner surface of the outer container body 110, or by being recessed outward from the inner surface of the outer container body 110.

The guide surface 164 is preferably configured to have a width corresponding to the width of the transparent electrode film 240. That is, the transparent electrode film 240 may be attached to the guide surface 164, so the size of the width of such a guide surface 164 may be the same as the size of the width of the transparent electrode film 240, or is preferably configured to be at least slightly larger than the size of the width of the transparent electrode film 240.

As described above, the transparent electrode film 240 may be vertically and longitudinally attached to the film guide 160 formed on the inner surface of the outer container body 110.

In addition, the transparent electrode film 240 may bend perpendicularly at a connection part A of the main handle 302 with the upper end of the outer container body 110. In this case, to prevent the cutting of the transparent electrode film 240, the connection part A is preferably configured in an arc shape having a radius R of a predetermined size. That is, the connection part A at which the upper end of the right surface of the outer container body 110 and the bottom surface 235a of the mounting end 235 meet may be configured to have curvature such that the transparent electrode film 240 is effectively attached.

Meanwhile, a magnet groove 126 may be formed in the upper end of the inner container body 120 by being recessed therefrom to the outside so as to receive the permanent magnet 232 therein. That is, as illustrated in the drawing (see FIG. 7) the upper end of the right surface of the inner container body 120 may be bent to be stepped to the right so as to form the magnet groove 126, and such a magnet groove 126 may be a part in which the permanent magnet 232 and a magnet holder 404 to be described below are located.

In addition, it is preferable that the magnet groove 126 is formed at a side of the reed switch groove 236. That is, as illustrated in the drawing (see FIG. 7), the magnet groove 126 may be formed at the left of the reed switch groove 236 in which the reed switch 234 is received. Accordingly, the reed switch 234 received in the reed switch groove 236 and the permanent magnet 232 may be close to each other, so the reed switch 234 may be operated by the permanent magnet 232.

The container lid 400 may be composed of an outer wall 410 configured in a shape of a circular ring and constituting the appearance of the container lid, an inner wall 420 provided to have a diameter smaller than a diameter of the outer wall 410 and having the lid hole 401 formed thereinside, and an upper surface 430 connecting an upper end of the outer wall 410 with an upper end of the inner wall 420.

Specifically, the container lid 400 may have a shape of a circular ring, as a whole, having a hollow inner part having a predetermined width. That is, the container lid 400 may have the lid hole 401 to be described below formed therein by passing vertically therethrough, and may have the structure of a circular ring having a U-shaped section.

The container lid 400 is intended to cover the upper surface of the container body 100, and the lid hole 401 may be formed vertically through the center portion of the container lid 400, wherein the cap 450 may be mounted removably to the lid hole 401. That is, as illustrated in FIG. 13, a hole may be formed vertically through the center portion of the container lid 400 to constitute the lid hole 401, and the cap 450 may cover such a lid hole 401.

The cap 450 may be composed of a top plate 460 exposed from the upper side of the container lid 400, and a cap body 470 is received in the lid hole 401.

As illustrated in FIG. 13, the cap body 470 may be configured in a shape of a truncated cone having a hollow inner part. That is, the cap body 470 may be configured in the shape of a truncated cone having a diameter gradually decreasing going upward.

The top plate 460 may cover the upper surface of the cap body 470 having a predetermined height, and as illustrated in the drawing, may be configured to have a diameter larger than a diameter of the upper end of the cap body 470.

The cap body 470 may include a middle ring 472 formed by protruding outward therefrom and in contact with the inner surface of the upper end of the lid hole 401, and a lower ring 474 formed by protruding outward from the outer circumferential surface of the lower end of the cap body and in contact with the inner surface of the lower end of the lid hole 401.

Specifically, the middle ring 472 may be formed by protruding outward from the center portion of the cap body 470, and may constitute the same plane as the upper surface 430 of the container lid 400 when the cap 450 is mounted to the container lid 400. Accordingly, the upper part of the middle ring 472 may be exposed to the upper side of the container lid 400.

An air groove 476 may be formed in the middle ring 472.

The air groove 476 may allow air to flow to the upper and lower sides of the middle ring 472 of the cap 450, and may be formed by being recessed inward from the outer circumferential surface of the middle ring 472 as illustrated in FIG. 14.

As illustrated in FIG. 15, the lower ring 474 may be formed by protruding by a predetermined size outward from the outer circumferential surface of the lower end of the cap body 470, and the outer circumferential surface of such a lower ring 474 may be in contact with the inner circumferential surface of the lower end of the inner wall 420 of the container lid 400.

As illustrated in FIG. 15, the outer wall 410 may be configured to correspond to a vertical size of the inner wall 420 or may be preferably configured to have a vertical size larger than the vertical size of the inner wall 420.

In addition, the gasket 402 described above may be provided on the outer circumferential surface of the lower end of such an outer wall 410. The gasket 402 is preferably made of an elastic material such as rubber.

A middle protrusion part 422 supporting the lower end of the middle ring 472 of the cap 450 may be formed on the inner surface of the inner wall 420, and a lower protrusion part 424 in contact with the outer surface of the lower ring 474 may be formed by protruding inward from the inner surface of the inner wall 420.

As illustrated in the drawing, the middle protrusion part 422 may be formed to have a predetermined thickness by protruding inward from the inner surface of the inner wall 420. Such a middle protrusion part 422 is preferably configured by being divided into multiple middle protrusion parts. Accordingly, air may vertically flow through space between the multiple middle protrusion parts 422.

The lower protrusion part 424 may be formed by protruding inward from the inner surface of the lower end part of the inner wall 420, and as illustrated in FIG. 15, is preferably configured to protrude inward more than the middle protrusion part 422.

Meanwhile, a fastening protrusion 478 may be formed on the lower end of the cap 450 by protruding outward therefrom, and a locking path 440 may be formed on the lower end of the inner wall 420 such that the fastening protrusion 478 is received in the locking path so as not to be removed therefrom.

More specifically, the fastening protrusion 478 may be formed on the outer circumferential surface of the lower ring 474 of the cap 450 by protruding outward therefrom. Such a fastening protrusion 478 is configured such that the cap 450 is not removed from the container lid 400 after being mounted thereto.

The locking path 440 may prevent the fastening protrusion 478 from being removed upward therefrom after the fastening protrusion 478 is received in the locking path 440. The locking path 440 may be formed by being recessed outward from the inner circumferential surface of the lower protrusion part 424 of the inner wall 420, and may be composed of an entrance groove 442 guiding the vertical movement of the fastening protrusion 478, and a locking groove 444 formed by extending laterally from the lower end of the entrance groove 442 and preventing the upward removal of the fastening protrusion 478.

That is, as illustrated in FIG. 15, a portion of the lower protrusion part 424 may be cut to form the entrance groove 442, and the entrance groove 442 may be connected to the locking groove 444 formed by extending laterally by a predetermined length after such an entrance groove 442 extends downward and bends perpendicularly.

Accordingly, when the fastening protrusion 478 moves downward along the entrance groove 442, moves laterally, and is received in the locking groove 444, the fastening protrusion 478 may be prevented from being removed upward therefrom.

Of course, the entrance groove 442 and the locking groove 444 may function to define a gap between the cap 450 and the container lid 400, and may function as an air flow path such that the air flows in the vertical direction of the container lid 400. That is, air may flow to the inside and outside of the container body 100 through the locking path 440 and the air groove 476.

Accordingly, the reason in which the air is allowed to flow to the inside and outside of the container body 100 with the locking path 440 and the air groove 476 not being located on the same vertical line is to prevent pressure difference between the inside and outside of such a container body 100, and to prevent the ejection of the food contained in the container body 100 to the outside, since when the food inside the container body 100 is crushed or mixed, the inner pressure of the container body 100 may be different from an atmospheric pressure.

A magnet holder 404 may be provided on the outer circumferential surface of the container lid 400. That is, as illustrated in the drawing, the magnet holder 404 may be formed on the outer circumferential surface of the container lid 400 by protruding therefrom to the outside, and have the permanent magnet 232 mounted therein.

The permanent magnet 232 is intended to control the turning on/off of the reed switch 234 when the container lid 400 is mounted to or removed from the container body 100.

Meanwhile, the lower surface of the container body 100 may be configured to have a shape corresponding to a shape of the upper surface of the main body 500 such that the container body 100 may be easily attached to and detached from the upper surface of the main body 500.

More particularly, the container body 100 may be mounted to a seating step 900 of the main body 500 to be described below.

Accordingly, the lower surface of the container body 100 may be configured to have the shape corresponding to the shape of the upper end of the main body 500, so the container body 100 may be stably mounted to and removed from the main body 500.

A container body end 170 having a predetermined width may be formed on the lower surface of the container body 100 by protruding downward therefrom. The container body end 170 may be a part which is in contact with the upper surface of a lower step 910 of the main body 500 to be described below, and may be configured to have a shape corresponding to the upper surface of the lower step 910.

An upper step receiving groove 172 may be formed in the center of the lower surface of the container body 100 by being recessed upward therefrom. That is, the upper step receiving groove 172 may be formed by being recessed upward at the inner side of the container body end 170 of the container body 100. When the container body 100 is mounted to the main body 500, an upper step 920 of the main body 500 to be described below may be received in such an upper step receiving groove 172.

The container body end 170 may have the shape of a circular ring having a partially open part, and the open part may be a part in which a coil seating part 940 to be described below is received. That is, the right end of the container body end 170 may be open and a coil seating part groove 170a may be formed therein. The coil seating part 940 to be described below may be received in such a coil seating part groove 170a.

A circular end 174 may be formed on the center of the lower surface of the container body 100 by protruding downward therefrom. That is, the circular end 174 protruding downward may be provided in the center of the upper step receiving groove 172.

As illustrated in the drawing, the circular end 174 may have the shape of a circular ring and be hollow therein, which may provide a passage connecting the blade assembly 200 to the motor assembly 600.

The circular end 174 may be a part received in a circular end receiving groove 980 formed in the main body 500 to be described below.

Multiple mounting protrusions 174*a* may be formed on the outer circumferential surface of the circular end 174 by protruding radially therefrom. Each of the mounting protrusions 174*a* may function to tightly mount the container body 100 to the corresponding position of the main body 500 such that the container body 100 does not rotate. The mounting protrusion 174*a* may have at least one mounting protrusion 174*a*.

In the present disclosure, the mounting protrusion 174*a* is illustrated to have four mounting protrusions 174*a*. As illustrated in the drawing, such a mounting protrusion 174*a* may be formed to have thickness gradually decreasing toward the outside. This is intended to easily receive the mounting protrusions 174*a* in protrusion grooves 982 to be described below.

Figure 17:
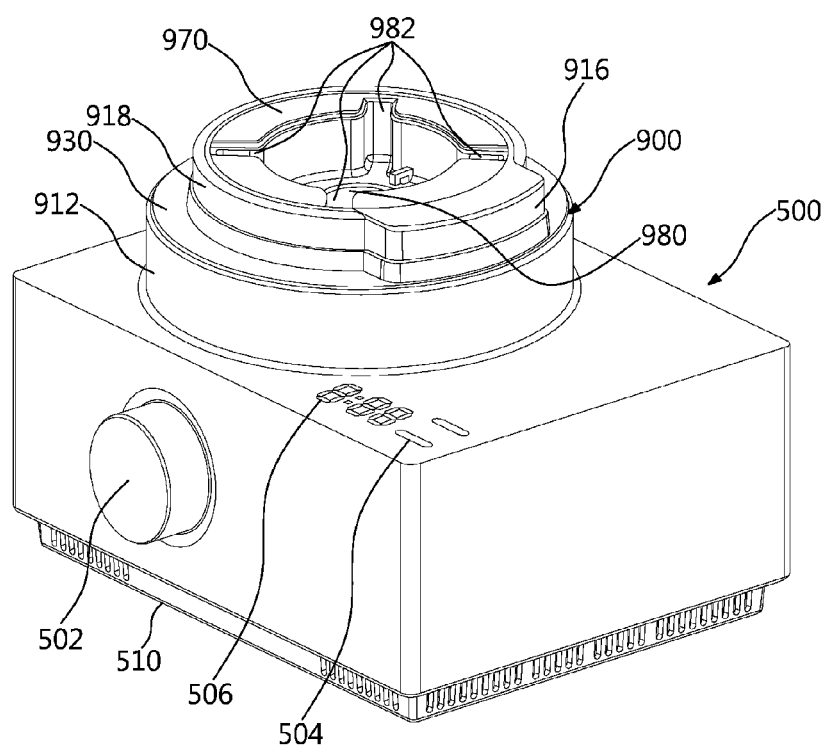
FIG. 17 is a perspective view of a main body constituting the blender according to an embodiment of the present disclosure.
Figure 18:
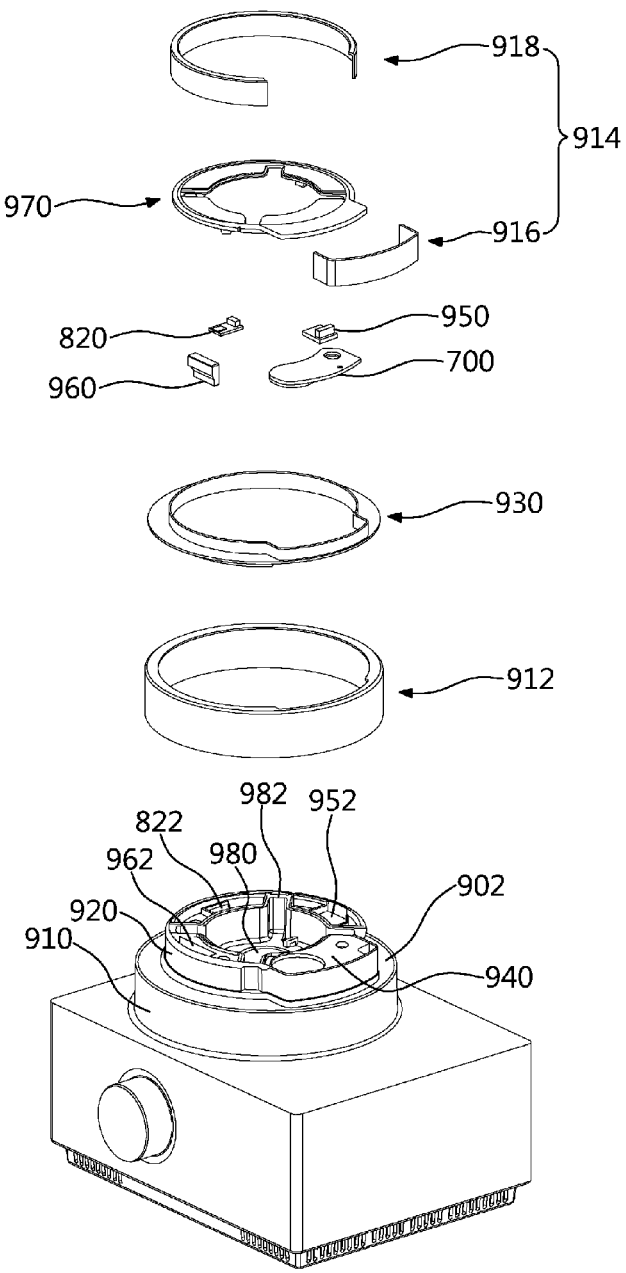
FIG. 18 is an exploded perspective view illustrating a configuration of an upper half of the main body constituting the blender according to the embodiment of the present disclosure.
Figure 19:
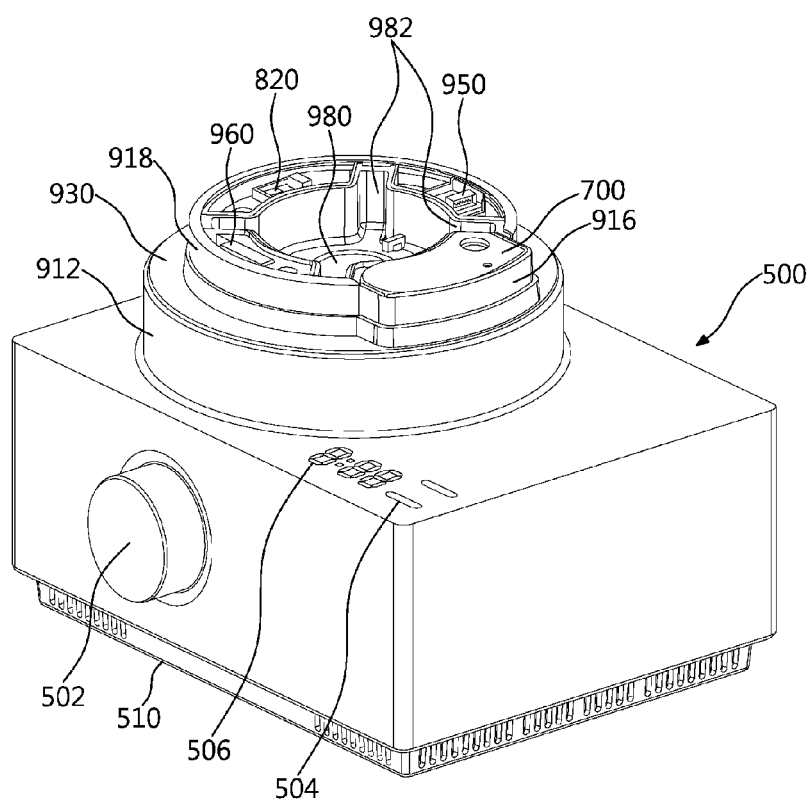
FIG. 19 is illustrating a configuration of the main body in a state in which a cover is removed from the main body constituting the blender according to the embodiment of the present disclosure.

In FIGS. 17 to 19, a configuration of an upper half part of the main body 500 is illustrated in detail. That is, FIG. 17 is a perspective view of the main body 500; FIG. 18 is an exploded perspective view illustrating a configuration of the upper half part of the main body 500; and FIG. 19 is a perspective view illustrating a configuration of the main body 500 from which the cover is removed.

As illustrated in these drawings, the seating step 900 may be provided on the upper surface of the main body 500 by protruding therefrom to be stepped upward such that the lower surface of the container body 100 is seated thereon.

The seating step 900 may be a part by which the lower end of the container body 100 is seated and be supported. Accordingly, such a seating step 900 may be configured to have the shape corresponding to the shape of the lower part of the container body 100.

Particularly, the seating step 900 may be formed by being stepped, and may include the lower step 910 having a diameter corresponding to the diameter of the lower end of the container body 100, and the upper step 920 formed by protruding upward from the lower step 910 and having a diameter smaller than the diameter of the lower step 910.

As illustrated in the drawing, the lower step 910 may be configured to have a circular shape and a predetermined height, and the upper step 920 having a diameter smaller than the diameter of the lower step 910 may be formed on the upper part of such a lower step 910 by protruding upward therefrom to have a predetermined height. Accordingly, like the upper surface of the main body 500, a horizontal step surface 902 may be formed between the lower step 910 having the larger diameter and the upper step 920 having the smaller diameter.

A lower step ring 912 and an upper step ring 914 having shapes corresponding to the outer surfaces of the lower step 910 and the upper step 920, respectively, may be provided on the outer surfaces of the lower step 910 and the upper step 920, respectively. That is, the lower step ring 912 and the upper step ring 914 may be provided on the outer circumferential surfaces of the lower step 910 and the upper step 920, respectively, which have the outer surfaces of circular shapes, and may cover the outer surfaces (side surfaces) of the lower step 910 and the upper step 920.

The lower step ring 912 and the upper step ring 914 may protect parts thereinside and may function as exterior materials. Accordingly, like the outer handle 304, the lower step ring 912 and the upper step ring 914 may be made of a material such as stainless steel which has a smooth surface and is resistant to rust.

In addition, an elastic member 930 made of an elastic material may be provided on the step surface 902 provided between the upper step 920 and the lower step 910. As illustrated in the drawing, the elastic member 930 may be configured to cover the step surface 902 formed on the upper surface of the lower step 910, and to cover the lower half part of the upper step 920.

The elastic member 930 may be made of an elastic material, and thus may function to buffer impact which may be generated when the container body 100 sits on the main body 500. That is, when the lower surface of the container body 100 sitting on the upper step 920 is in contact with the upper step 920, the elastic member 930 may function to prevent breakage or noise that may occur due to the collision of the lower surface of the container body 100 with the upper step 920 and the lower step 910 of the main body 500, which are made of solid materials.

Accordingly, the elastic member 930 may be made of a material such as rubber, and may function to make the seating of the container body 100 efficient. Further, the elastic member 930 may be made of a conductive rubber when required, and in this case, the conductive rubber may be provided even on the lower surface of the container body 100.

The power transmission part 700 and the signal reception part 820 may be mounted to the upper surface of the upper step 920.

Particularly, the coil seating part 940 may be formed on the right surface of the upper step 920 by protruding therefrom to the right, and the power transmission part 700 may be mounted to the upper surface of such a coil seating part 940.

The power transmission part 700 may be located to be adjacent to the power reception part 220 provided in the container body 100, and may function to supply power to the power reception part 220. Accordingly, such a power transmission part 700 may be configured as an induction coil. That is, like the power reception part 220, the induction coil may be configured by being wound multiple times on the same plane, such as a PCB, in a spiral shape relative to a transmission center point (not shown).

In addition, although not shown in detail, the main body 500 may have an oscillation circuit part therein. Such an oscillation circuit part may generate current and apply the current to the power transmission part 700. Accordingly, a magnetic field may be formed in the power transmission part 700 by the applied current. Furthermore, the oscillation circuit part may change the intensity of the current applied to the power transmission part 700, and thus the magnetic field may be changed in the power transmission part 700 by the change of the current intensity.

Accordingly, as in the present disclosure, with the power reception part 220 and the power transmission part 700 installed to vertically correspond to each other, as the intensity of current applied to the power transmission part 700 changes, the magnetic field of the power transmission part 700 may be changed, and a magnetic flux passing through the power reception part 220 may be changed due to inductive coupling between the power transmission part 700 and the power reception part 220, so the induced electromotive force may be generated in the power reception part 220. Furthermore, such an induced electromotive force may be supplied to the signal transmission part 810.

The signal reception part 820 may be provided at a side opposite to the power transmission part 700. That is, the signal reception part 820 may be mounted in a receiving groove 822 formed in the left end of the upper surface of the upper step 920, which is a position vertically corresponding to the signal transmission part 810 mounted to the container body 100.

Particularly, the receiving groove 822 having a predetermined size may be formed in the left end of the upper surface of the upper step 920 by being depressed therefrom, and the signal reception part 820 may be mounted in such a receiving groove 822.

As described above, the signal reception part 820 may include the photosensor. The light reception module 820 may receive light transmitted by the signal transmission part 810, and transmit a light reception signal.

In addition, a Hall sensor 950 and a container body detection switch 960 may be provided on the upper surface of the upper step 920. That is, a container body switch groove 962 and a sensor groove 952 may be formed in the front end portion and rear end portion of the upper surface of the upper step 920, respectively, by being depressed therefrom, and the container body detection switch 960 and the Hall sensor 950 may be mounted in the container body switch groove 962 and the sensor groove 952, respectively.

The container body detection switch 960 may be configured as a reed switch, and may detect whether the container body 100 is seated on the upper surface of the main body 500. When such a container body detection switch 960 is provided, a magnet (not shown) corresponding thereto may be provided on the lower end of the container body 100.

The Hall sensor 950 is intended to determine a type of the container body 100 sitting on the main body 500, and even in this case, a signal transmission part corresponding thereto may be required on the lower surface of the container body 100.

The upper step ring 914 mounted to the edge of the upper step 920 may be configured to be divided into two parts. That is, as illustrated in FIG. 6, the upper step ring 914 may include a protruding piece 916 covering the outer surface of the coil seating part 940 formed on the right surface of the upper step 920 by protruding therefrom to the right, and a curved piece 918 covering the remaining outer surface of the upper step 920.

Meanwhile, the upper part of the upper step 920 may be covered by a cover 970. Accordingly, the power transmission part 700, the signal reception part 820, the container body detection switch 960, and the Hall sensor 950 mounted to the upper step 920 may be covered and protected by the cover 970.

In addition, the seating step 900 may have a center vertically formed therethrough such that the blade assembly 200 of the container body 100 and the motor assembly 600 provided in the main body 500 may be connected to each other.

More particularly, the circular end receiving groove 980 may be formed in the center portion of the upper step 920 by being depressed therefrom, and the circular end 174 of the lower end of the container body 100 described above may be received in such a circular end receiving groove 980. That is, the upper step 920 may have the shape of a circular ring as a whole, and the circular end receiving groove 980 having a circular shape may be formed in the center portion of such an upper step 920.

At least one protrusion groove 982 may be formed in the inner surface of the upper step 920. The protrusion groove 982 may be formed by being depressed radially from the circular end receiving groove 980, and the mounting protrusions 174a of the container body 100 may be seated in the protrusion grooves 982.

Accordingly, the protrusion grooves 982 may be configured to have the size and number thereof corresponding to the size and number of the mounting protrusions 174a, and the size of the width of the protrusion groove 982 may be configured to be the same as or larger than the size of the width of the mounting protrusion 174a.

Figure 20:
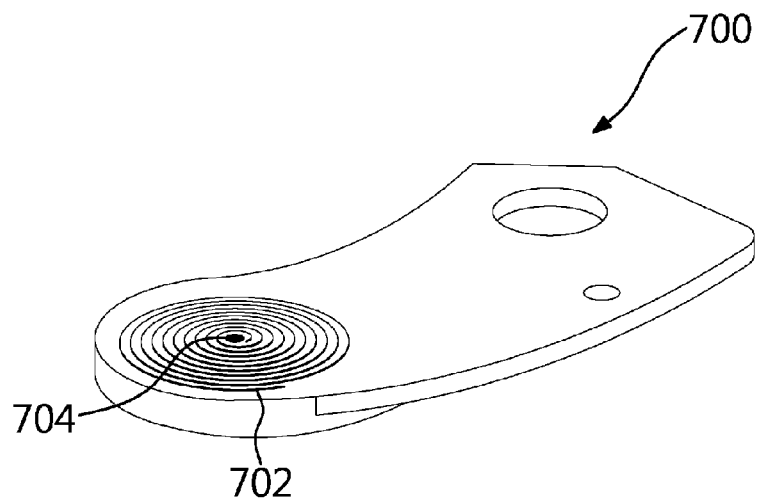
FIG. 20 is a perspective view of a power transmission means constituting the blender according to the embodiment of the present disclosure.
Figure 21:
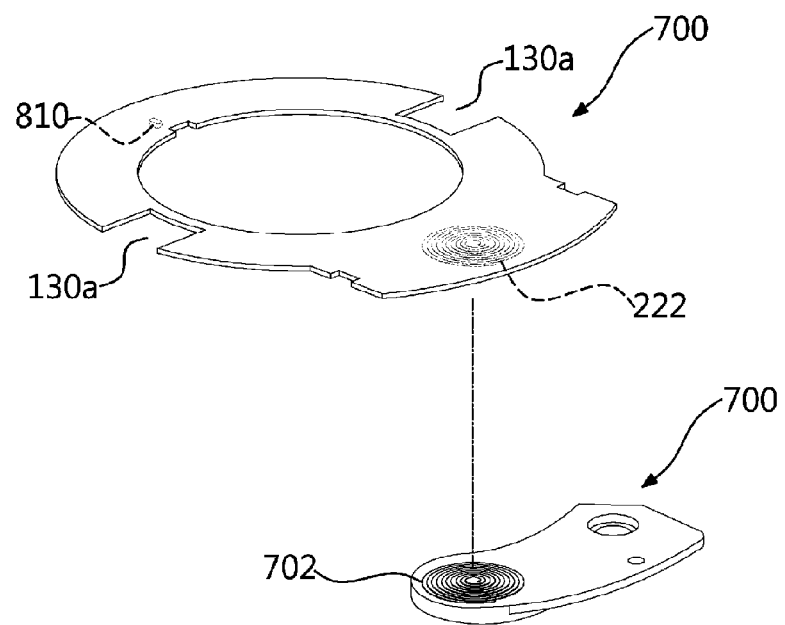
FIG. 21 is an exploded perspective view illustrating a mutual arrangement of a power transmission part and the coil holder constituting the blender according to the embodiment of the present disclosure.
Figure 22:
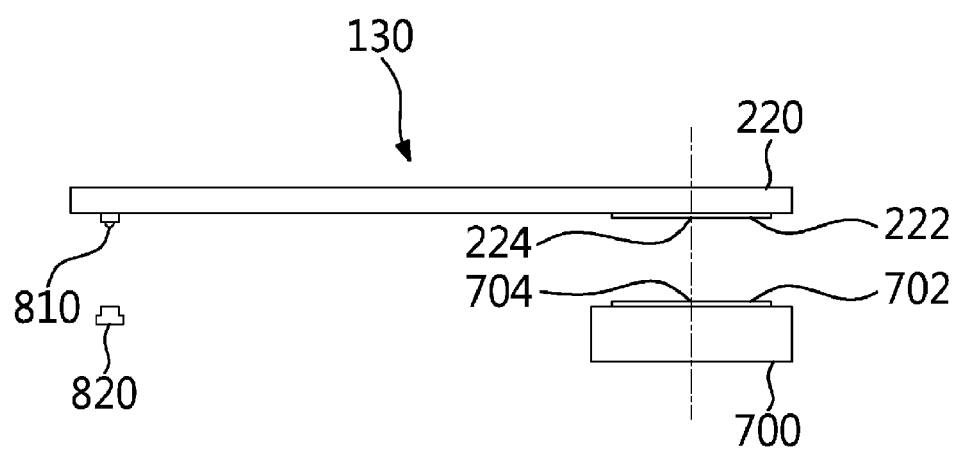
FIG. 22 is an exploded front view illustrating the mutual arrangement of the power transmission part and the coil holder constituting the blender according to the embodiment of the present disclosure.

In FIGS. 20 to 22, a configuration of a power transmission part 700 and an example of the arrangement relation of the power transmission part and the coil holder are illustrated. That is, FIG. 20 is a perspective view of the power transmission part 700 constituting the blender according to the embodiment of the present disclosure, and FIGS. 21 and 22 are an exploded perspective view and an exploded front view, respectively, illustrating a mutual arrangement relation of the power transmission part 700 and the coil holder 130.

As described above, the power transmission part 700 may be installed on a side of the upper part of the main body 500.

The power transmission part 700 may be embodied with a transmission induction coil 702 patterned on the same plane as a PCB. The transmission induction coil 702 may be wound multiple times on the PCB in a spiral shape relative to a transmission center point 704.

The main body 500 may include the oscillation circuit part (not shown) therein. The oscillation circuit part (not shown) may apply current to the transmission induction coil 702, and when the current is applied to the transmission induction coil 702, a magnetic field may be generated in the transmission induction coil 702.

In addition, such an oscillation circuit part (not shown) may be mounted to the power transmission part 700, and may change the intensity of the current applied to the transmission induction coil 702, and thus the magnetic field may be changed in the transmission induction coil 702 by the change of the current intensity.

The signal transmission part 810 and the signal reception part 820 are preferably located to be adjacent to each other, and as illustrated in FIG. 2, when the container body 100 is mounted to the main body 500, the signal transmission part 810 and the signal reception part 820 may be located at upper and lower positions, respectively, close to each other.

When the signal reception part 820 receives the signal of the signal transmission part 810, the motor assembly 600 may operate.

Like the embodiment illustrated in FIG. 22, when the container body 100 is seated on the main body 500, the transmission induction coil 702 of the main body 500 and the reception induction coil 222 of the container body 100 are preferably disposed vertically at a predetermined interval at positions corresponding to each other.

Specifically, when the container body 100 is seated on the main body 500, the transmission induction coil 702 constituting the power transmission part 700 and the reception induction coil 222 constituting the power reception part 220 may be concentric in the same center points 704 and 224, and may be disposed to be parallel to each other by facing each other.

In addition, inductive coupling between the transmission induction coil 702 constituting the power transmission part 700 and the reception induction coil 222 constituting the power reception part 220 may be selectively performed under a specific condition.

When the intensity of current applied to the transmission induction coil 702 changes, the magnetic field of the transmission induction coil 702 may be changed, and a magnetic flux passing through the reception induction coil 222 may be changed due to inductive coupling between the transmission induction coil 702 and the reception induction coil 222, so induced electromotive force may be generated in the reception induction coil 222.

Accordingly, it is preferable that the positions and arrangement of the transmission induction coil 702 and the reception induction coil 222 are determined such that inductive coupling between the transmission induction coil 702 and the reception induction coil 222 is effectively performed.

Furthermore, as described above, the signal transmission part 810 configured to transmit a signal to the outside may be provided at the lower part of the container body 100, and in the embodiment, the signal transmission part 810 is illustrated to be installed on the left end of the lower surface of the coil holder 130.

In addition, it is preferable that the reception induction coil 222 of the coil holder 130 and the signal transmission part 810 are electrically connected to each other, and the signal transmission part 810 may transmit a signal by receiving power from the reception induction coil 222.

The signal transmission part 810 may transmit a signal to the signal reception part 820 provided in the main body 500. That is, the signal reception part 820 may receive the signal transmitted by the signal transmission part 810.

Accordingly, the signal transmission part 810 and the signal reception part 820 are preferably disposed at positions corresponding to each other such that the transmission and reception of a signal between the signal transmission part 810 and the signal reception part 820 are efficiently performed, and in the embodiment, when the container body 100 is coupled to the main body 500, the container body 100 and the main body 500 may be located vertically at a predetermined interval.

In addition, as described above, in the embodiment of the present disclosure, the signal transmission part 810 may, for example, include a light source which emits light, and the signal reception part 820 may include a light sensor which detects light emitted from the light source. The light source may include an LED light source, and the light sensor may be embodied as a semiconductor device, a photodiode, or a phototransistor, etc.

Hereinafter, an operation of the blender of the present disclosure having the above-described configuration will be described with reference to the accompanying drawings.

When the container body 100 sits on the main body 500, the state of FIG. 1 may be realized, and in this state, the operation of the blender of the present disclosure may start.

First, power supply from the outside may be required such that a user operates the blender, and a wireless power supply device having the wireless power module 520 may be used for such power supply. That is, the power supply from the outside may be performed by the induced electromotive force. Of course, the power supply may be performed by wire.

The power of the wireless power module 520 may be supplied to parts, in which power is required, such as the motor assembly 600, the manipulation part 504, and the power transmission part 700, and a user may start or stop the operation of the blender by manipulating the manipulation part 504 or the knob 502.

For example, when a user starts crushing food by manipulating the manipulation part 504 or the knob 502, the motor assembly 600 is required to be operated to rotate the blades of the blade assembly 200.

However, in this case, the detection system may determine whether the container lid 400 is closed, and when the container lid 400 is opened, the motor assembly 600 and the blade assembly 200 may not be operated.

Particularly, since the reed switch 234 may be normally open (off), the power reception part 220, the reed switch 234, and the signal transmission part 810 may not form a closed circuit in the container body 100, so that the signal reception part 820 may not receive light.

Accordingly, when the signal reception part 820 does not receive light, the power supply to the motor assembly 600 may be cut off by such a signal.

In this state, when the container lid 400 is closed, the permanent magnet 232 of the container lid 400 may be located to be adjacent to the reed switch 234, and the reed switch 234 may be turned on, whereby the power reception part 220, the reed switch 234, and the signal transmission part 810 may form a closed circuit, so the signal reception part 820 may receive light transmitted by the signal transmission part 810.

In this case, due to the detection of the closing of the container lid 400, the motor assembly 600 may start operating by the manipulation of the user, and the food inside the container body 100 may be crushed. Of course, in this case, whether the container body 100 is mounted to the main body 500 may be detected by the container body detection switch 960 prior to the starting of the operation of the motor assembly 600.

In addition, in this case, the operation state of the blender of the present disclosure may be displayed to the outside by the display part 506, so the user may visually recognize the operation state or time of the blender.

Meanwhile, when the container lid 400 is mounted to or removed from the container body 100, the user may open or close the container lid 400 by grasping the upper half part of the cap 450. The container lid 400 may be in close contact with and mounted to the upper surface of the container body 100 by a force of pushing the container lid 400 downward by the user. In this case, the gap between the container lid 400 and the container body 100 may be covered by the gasket 402 provided on the outer surface of the container lid 400.

Additionally, the cap 450 mounted to the center portion of the container lid 400 may be removed therefrom by the user, and this may be performed by the user turning the cap 450 while the user grips the upper end of the cap 450 as described above.

For example, in order to mount the cap 450 to the container lid 400, the user may pass the fastening protrusion 478 of the cap 450 through the entrance groove 442 of the container lid 400 to a lower side thereof from an upper side thereof while the user grips the upper end of the cap 450 and may turn the cap 450 clockwise. In this case, the fastening protrusion 478 may be received in the locking groove 444 and the mounting of the cap 450 may be completed and at the same time, the upward removal of the cap 450 may be prevented.

In this state, when turning the cap 450 counterclockwise by gripping the upper end of the cap 450, the fastening protrusion 478 may be moved from the locking groove 444 and be located at the lower side of the entrance groove 442. In this case, when the user moves the cap 450 upward, the fastening protrusion 478 may pass through the entrance groove 442 to the upper side thereof from the lower side thereof, so the cap 450 may be removed from the container lid 400.

In addition, even when the cap 450 is mounted to the container lid 400, air may flow to the upper and lower sides of the container lid 400 through the air groove 476, so the vacuumization of the inside of the container body 100 or the generation of pressure difference between the inside and outside of the container body 100 may be prevented.

When the cap 450 is removed from the lid body 410 through the process described above, the user may insert food into the container body 100 through the lid hole 401, and may stir the food contained inside the container body 100 by using a rod.

When the food inside the container body 100 is crushed or mixed by the operation of the motor assembly 600 and the blade assembly 200 and the work according to the intention of the user is completed, the user may raise and remove the container body 100 upward from the main body 500, open the container lid 400, and take out the food contained inside the container body 100.

The scope of the present disclosure is not limited to the embodiment illustrated above, and within the technical scope as described above, many other modifications based on the present disclosure will be possible for those skilled in the art.

For example, in the embodiment described above, the installation positions of the signal transmission part 810 and the signal reception part 820 are described to be located on the left ends of the container body 100 and the main body 500, respectively, but the installation positions of the signal transmission part 810 and the signal reception part 820 may be located on the right ends of the container body 100 and the main body 500, respectively, or on front or rear ends thereof.

In addition, in the embodiment described above, one signal reception part 820 is illustrated to be mounted to the main body 500, but at least two signal reception part 820 may be mounted thereto. The signal reception part 820 may be configured in a ring shape on the upper surface of the upper step 920 to detect whether the container lid 400 is mounted irrespective of the mounting direction of the container body 100.

In addition, a transmission coil constituting the power transmission part 700 may include at least two transmission coils or may be configured in a ring shape on the upper surface of the upper step 920 such that power transmission is not limited to the mounting position of the container body 100.

In addition, the detection system may be configured variously. That is, instead of the signal transmission part 810 and the signal reception part 820, and the power transmission part 700 and the power reception part 220, an electrode plate (not shown) may be mounted to each of the container body 100 and the main body 500 so as to determine whether a capacitor is charged and a capacitance is detected, or an Hall IC or a reed switch may be used to detect whether a change of a magnetic field in the power reception part 220 occurs.

The invention claimed is:

1. A blender comprising:
a container body to receive food;
a main body to support the container body;
a container lid to removably mount to an upper surface of the container body to open and close an upper part of the container body;
a detection system to detect whether the container lid is mounted to the container body; and
a coil holder disposed at a lower side of the container body and including at least one part for receiving power, or transmitting a signal between the container body and the main body;
wherein the at least one part comprises a power reception part to receive the power supplied from the main body, and a signal transmission part to transmit the signal by emitting light by electricity supplied from the power reception part;
wherein the power reception part and the signal transmission part are electrically connected to each other at the coil holder.

2. The blender of claim 1, wherein the coil holder has a shape of a circular ring.

3. The blender of claim 1, wherein the container body comprises an outer container body and an inner container body constituting appearances of outer and inner parts, respectively, of the container body, and
the coil holder is provided between a bottom surface of the outer container body and a lower surface of the inner container body.

4. The blender of claim 1, wherein the power reception part and the signal transmission part are disposed at opposite ends, respectively, of the coil holder, such that the power reception part and the signal transmission part are spaced apart from each other.

5. The blender of claim 1, wherein the power reception part and the signal transmission part are disposed at an end of the coil holder such that the power reception part and the signal transmission part are adjacent to each other.

6. The blender of claim 1, wherein the power reception part comprises an induction coil to receive the power by induced electromotive force.

7. The blender of claim 1, wherein the signal transmission part comprises a light emitting diode (LED) to generate light.

8. The blender of claim 1, comprising a transparent electrode film to connect the detection system to the coil holder.

9. The blender of claim 8, wherein the coil holder comprises a terminal at which an end of the transparent electrode film is connected.

10. The blender of claim 1, comprises an upper cover and a lower cover to cover an upper side and a lower side of the coil holder, respectively.

11. The blender of claim 10, wherein
the upper cover comprises an upper edge extending downward on a circumferential surface of the upper cover; and
the lower cover comprises a lower edge extending upward on a circumferential surface of the lower cover,
wherein the upper edge of the upper cover and the lower edge of the lower cover connects to each other with the coil holder therebetween.

12. The blender of claim 11, wherein the upper cover comprises an opening to receive a transparent electrode film.

13. The blender of claim 11, wherein the lower cover comprises an opening corresponding to a position of the at least one part at the coil holder, the at least one part being a signal transmission part that emits light.

* * * * *